United States Patent [19]
Iritani

[11] Patent Number: 6,073,459
[45] Date of Patent: Jun. 13, 2000

[54] REFRIGERATION CYCLE CONTROL SYSTEM

[75] Inventor: Kunio Iritani, Anjo, Japan

[73] Assignee: Denso Corporation, Kariya, Japan

[21] Appl. No.: 09/198,762

[22] Filed: Nov. 24, 1998

[30] Foreign Application Priority Data

Nov. 28, 1997 [JP] Japan ................................. 9-329223
Oct. 1, 1998 [JP] Japan ................................. 10-280128

[51] Int. Cl.[7] ........................... F25B 41/04; F25B 1/00
[52] U.S. Cl. ........................... 62/204; 62/211; 62/228.4
[58] Field of Search ........................... 62/204, 223, 211, 62/222, 228.4

[56] References Cited

U.S. PATENT DOCUMENTS 5,115,644  5/1992  Alsenz .................................. 61/181
5,701,753  12/1997  Iritani .

FOREIGN PATENT DOCUMENTS 404283361  10/1992  Japan .................................. 62/204

*Primary Examiner*—William Wayner
*Attorney, Agent, or Firm*—Harness, Dickey & Pierce, PLC

[57] ABSTRACT

In order to suppress the deterioration of the efficiency of the refrigeration cycle when the theoretical supercooling degree is different from the actual supercooling degree due to an error of a sensor, upon a decision that an expansion valve opening degree remains unchanged after the lapse of a predetermined time following the starting of an air-conditioning system, a target supercooling degree is corrected and the valve opening degree is reduced from an upper limit by a predetermined value to an intermediate valve opening degree. As a result, the actual supercooling degree can leave the state of zero dryness, and can approach a target supercooling degree.

19 Claims, 14 Drawing Sheets

REFRIGERATION CYCLE CONTROL SYSTEM

BACKGROUND OF THE INVENTION

1. Field of the Invention

The present invention relates to an air-conditioning system and a refrigeration cycle control system, for controlling the supercooling degree of a liquid refrigerant of a condenser to a predetermined target value by controlling an electric expansion valve of a refrigeration cycle, which, in addition to the condenser and the electric expansion valve, includes a compressor and an evaporator.

2. Description of the Related Art

Japanese Unexamined Patent Publication (Kokai) No. 9-14780 discloses a system in which the supercooling degree in the condenser is controlled to a proper value in order to control the efficiency of the refrigeration cycle to a maximum. Specifically, first, a target supercooling degree providing a target value of the supercooling degree is determined in accordance with the atmospheric temperature or the like. A supercooling degree is calculated by an air-conditioning control unit from the pressure detected by a high-pressure sensor arranged on the outlet of the compressor and the temperature detected by a refrigerant temperature sensor arranged on the refrigerant outlet of the condenser. The valve opening degree of the electric expansion valve is controlled by the air-conditioning control unit in such a manner that the calculated supercooling degree assumes the target supercooling degree. Specifically, in the case where the supercooling degree is increased, the valve opening degree is decreased, so that the high pressure is increased to increase the liquid refrigerant in the condenser. In the case where the supercooling degree is decreased, on the other hand, the valve opening degree is increased to reduce the high pressure for a reduced liquid refrigerant in the condenser.

In the above-mentioned conventional system, a cooling control valve and a heating control valve are provided as the electric expansion valve in a refrigeration cycle of a heat pump type in which the refrigerant flow is switched between the cooling and the heating modes. When the cooling mode is started, for example, the valve opening degree of the cooling control valve is maximized, so that an abnormal increase in the high pressure is prevented at the time of starting the refrigeration cycle. At the same time, the refrigerant circulation amount at the time of starting is secured in an effort to improve the starting characteristic of the refrigeration cycle.

Also, in the conventional system, at the time of cooling, for example, a target temperature of the air passed through the evaporator is calculated in accordance with the set position of a blowing temperature setting lever, and the rotational speed of the compressor is controlled to attain the target temperature.

The high pressure sensor and the refrigerant temperature sensor, however, are varied in accuracy from one product to another. The calculated, i.e. theoretical supercooling degree described above, therefore, sometimes develops a considerable error.

For this reason, some automotive vehicles pose the problem that the calculated supercooling degree increases beyond the actual supercooling degree so that the actual refrigeration cycle is operated with such a low efficiency as to have a dryness of zero or less in supercooling degree. In other cases, the calculated supercooling degree becomes smaller than the actual supercooling degree, in which case the actual refrigeration cycle is deteriorated to low efficiency due to the excessively large supercooling degree.

SUMMARY OF THE INVENTION

Accordingly, the object of the present invention is generally to suppress the deteriorated efficiency of the refrigeration cycle which is caused by the error in the sensor for calculating the supercooling degree. Specifically, a first object of the invention is to suppress the deteriorated efficiency of the refrigeration cycle when the calculated supercooling degree is higher than the actual supercooling degree. A second object of the invention is to suppress the deteriorated efficiency of the refrigeration cycle when the calculated supercooling degree is lower than the actual supercooling degree at the time of cooling.

In order to achieve the above-mentioned objects, the present inventor has actually produced a working model of the conventional system and studied it. As a result, it has been ascertained that the refrigeration cycle develops the following behavior.

Specifically, in the case where the calculated supercooling degree is higher than the actual supercooling degree due to the error described above, the valve opening degree of the electric expansion valve is maximized. After that, when the calculated supercooling degree is higher than the target supercooling degree, the valve opening degree is controlled upward in order to reduce the supercooling degree. In view of the fact that the valve opening degree assumes a maximum value, however, the valve opening degree remains maximum and the actual supercooling degree remains at an unnecessarily small value for a considerable length of time.

In the case where the calculated supercooling degree is lower than the actual supercooling degree, on the other hand, an excessive amount of the liquid refrigerant actually stays in the condenser, and the evaporator runs short of the gas. If the rotational speed of the compressor is controlled to attain a target rotational speed, the gas shortage abnormally increases the rotational speed of the compressor, thereby further reducing the efficiency of the refrigeration cycle.

The present invention has been conceived on the basis of the behavior discovered above. According to the present invention described in claim 1, in order to achieve the first object, the valve opening degree (EVC, EVH) is reduced by a predetermined value in the case where the amount of change of the valve opening degree (EVC, EVH) with respect to the initial valve opening degree (VC1, VH1) is smaller than a predetermined value during a second predetermined time after the lapse of a first predetermined time ($\tau1$).

In the case where the amount of change in the valve opening degree (EVC, EVH) relative to the initial valve opening degree (VC1, VH1) is smaller than a predetermined value during a second predetermined time after the lapse of the first predetermined time ($\tau1$), the efficiency of the refrigeration cycle is regarded to have deteriorated. In this case, the valve opening degree (EVC EVH) is reduced by a predetermined value. As a result, when the calculated supercooling degree is higher than the actual supercooling degree, the actual supercooling degree can be increased and thus the deteriorated efficiency of the refrigeration cycle can be suppressed.

According to the invention described in claim 6, the correction amount determined by correction means (S425) before the valve opening degree (EVC, EVH) is reduced by a predetermined value, is learned and stored so that the valve opening degree (EVC, EVH) is controlled by learning.

This control by learning can correct the sensor error and continue to suppress the deterioration of the refrigeration cycle.

According to the invention described in claim 7, the valve opening degree (EVC, EVH), after being reduced from the initial valve opening degree (VC1, VH1) and changing to a predetermined value, is held at the predetermined value as long as the refrigeration cycle (20) is working.

As a result, after the valve opening degree is changed to a predetermined value, this predetermined valve opening is held. Therefore, the valve opening degree is prevented from returning to the initial valve opening degree to deteriorate the efficiency of the refrigeration cycle. Thus the deteriorated efficiency of the refrigeration cycle is continually suppressed.

In order to achieve the second object described above, the invention described in claim 11 comprises signal generating means (40) for generating a signal (IVR) associated with the rotational speed (IVR). When the signal (IVR) increases beyond a predetermined rotational speed (IVX), the target supercooling degree (SCO) is corrected downward by a predetermined value, and the valve opening degree (EVC) is controlled to attain the corrected target supercooling degree (SCO-1).

Once the signal is increased beyond the predetermined rotational speed, the efficiency of the refrigeration cycle is regarded to have deteriorated. In this case, the target supercooling degree is corrected downward by a predetermined value, and the valve opening degree is controlled to attain the corrected target supercooling degree. The actual supercooling degree, therefore, approaches the target supercooling degree to be achieved. As a result, the refrigeration cycle can be prevented from deteriorating in efficiency.

According to the invention described in claim 12, the correction amount is learned and stored before the valve opening degree (EVC) increases by a predetermined value. Thus, the valve opening degree (EVC) is controlled by learning.

This learning control can correct the sensor error and continue to suppress the deterioration of the refrigeration cycle efficiency.

According to the invention described in claim 13, there is provided a refrigeration cycle control system comprising signal generating means (40) for generating a signal (IVR) associated with the rotational speed (IVR), wherein a predetermined valve opening is set and when the signal (IVR) increases beyond a predetermined rotational speed (IVX), the valve opening degree (EVC) is immediately controlled upward by the predetermined valve opening.

This also produces an effect similar to that of the invention described in claim 11.

According to the invention described in claim 14, the valve opening degree (EVC) is held at the maximum opening degree (VC1) in the range of working opening degree for a predetermined time ($\tau_4$) before the target supercooling degree (SCO) is corrected and the valve opening degree (EVC) is controlled.

When the signal increases beyond the predetermined rotational amount, it indicates that the liquid refrigerant stays excessively in the condenser, as described above. For the liquid refrigerant thus accumulated to be used as a circulation amount of the refrigeration cycle with rapidity, the valve opening degree of the electric expansion valve constituting a circulation path of the refrigerant is increased as much as possible.

In view of this, according to the present invention, when the signal increases beyond the predetermined rotational speed, the valve opening degree is held at the maximum opening degree for a predetermined length of time. In this way, the gas shortage in the evaporator can be eliminated with rapidity, and the rotational speed of the compressor can be reduced within a short time. Further, the rapid reduction in the rotational speed of the compressor can save the energy of the compressor while at the same time improving the efficiency of the refrigeration cycle.

According to the invention described in claim 15, the valve opening degree (EVC) is held at the maximum opening degree (VC1) in the range of working opening degree for a predetermined time ($\tau_4$).

As a result, an effect similar to that of the invention described in claim 12 can be produced.

DESCRIPTION OF THE PREFERRED EMBODIMENTS

First Embodiment

Now, a first embodiment of the invention as applied to an air-conditioning system of an electric automotive vehicle will be explained with reference to FIGS. 1 to 14.

Figure 1:
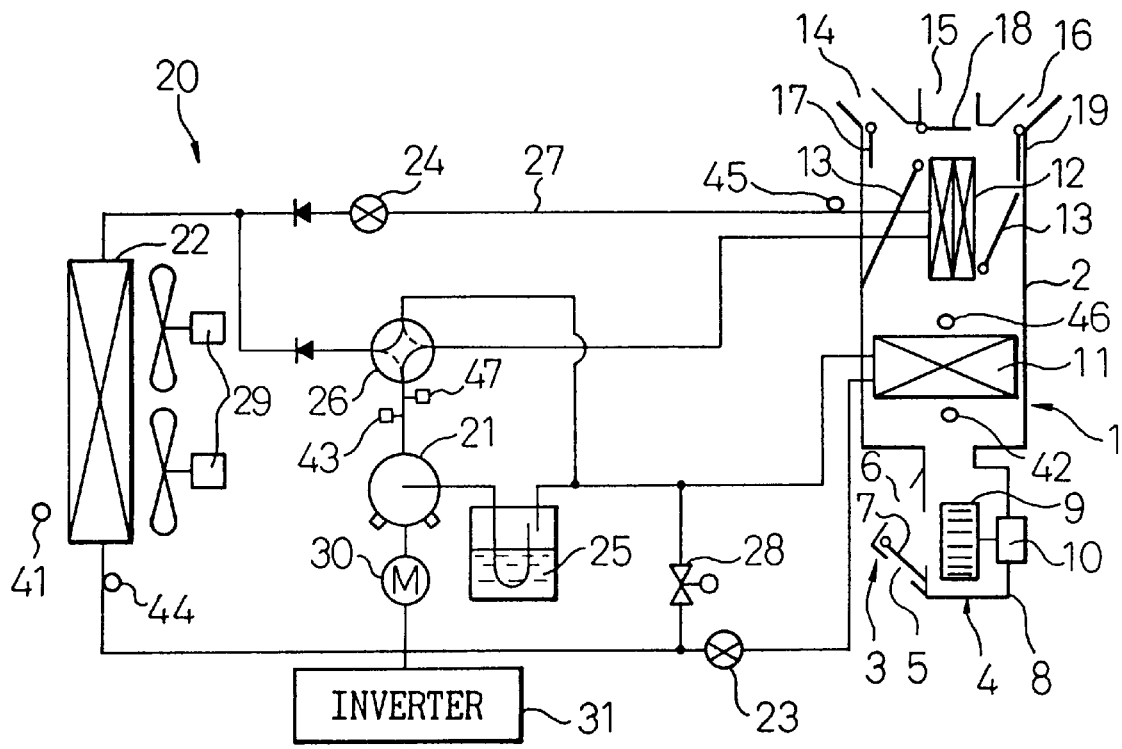
FIG. 1 is a diagram showing a general configuration of an air-conditioning system according to embodiments of the invention.

In FIG. 1, an air-conditioning case 2 of an air-conditioning unit 1 makes up an air path for leading the air into the cabin. Internal-external air switching means 3 and blower means 4 are arranged at an end of the air-conditioning case 2 and a plurality of air outlets 14 to 16 leading to the cabin are formed at the other end thereof.

The internal-external air switching means 3 includes an internal-external air switching box formed with an internal air intake port 5 for absorbing the air in the cabin (internal air) and an external air intake port 6 for absorbing the air external to the cabin (external air). The internal-external air switching box houses therein an internal-external air switching door 7 for selectively opening and closing the intake ports 5, 6 and drive means (not shown, such as a servo motor) for driving the internal-external air switching door 7.

The blower means 4 is for generating an air flow in the air-conditioning case 2 from the internal air intake port 5 or the external air intake port 6 toward the air outlets 14 to 16. Specifically, a centrifugal multi-blade fan 9 is arranged in a scroll casing 8 is driven by a blower motor 10 constituting the drive means.

A cooling indoor heat exchanger 11 is arranged in the air-conditioning case 2 downstream of the fan 9 in the air flow. The cooling indoor heat exchanger 11 constitutes a part of the refrigeration cycle 20, and functions as an evaporator for evaporating the refrigerant from a cooling expansion valve 23 described later, in the cooling operation mode. In the heating operation mode described later, on the other hand, no refrigerant flows in the cooling indoor heat exchanger 11.

A heating indoor heat exchanger 12 is arranged in the air-conditioning case 2 downstream of the cooling indoor heat exchanger 11 in the air flow. This heating indoor heat exchanger 12 constitutes a part of the refrigeration cycle 20, and functions as a condenser for heating the air in the air-conditioning case 2 by radiation of heat through the refrigerant flowing in it in the heating operation mode described later. In the cooling operation mode described later, no refrigerant flows in the heating indoor heat exchanger 12.

An air mix door 13 is arranged at a position adjoining the heating indoor heat exchanger 12 in the air-conditioning case 2 for adjusting the amount of air imparted under pressure from the fan 9 between a portion flowing through the heating indoor heat exchanger 12 and a portion bypassing the heating indoor heat exchanger 12.

The air outlets 14 to 16 specifically include a defroster outlet 14 for blowing out the air-conditioning air to the inside surface of the windshield of the vehicle, a face air outlet 15 for blowing out the air-conditioning air toward the upper half part of occupants, and a foot air outlet 16 for blowing out the air-conditioning air toward the lower half part of the occupants. Doors 17 to 19 for opening and closing the air outlets are arranged upstream of the outlets in the air flow.

The refrigeration cycle 20 includes the cooling indoor heat exchanger 11 (evaporator) and the heating indoor heat exchanger 12 and constitutes a refrigeration cycle of heat pump type for cooling and heating the cabin interior. The component parts other than the heat exchangers 11, 12 include a compressor 21 for compressing the refrigerant, an outdoor heat exchanger 22, a cooling expansion valve 23, a heating expansion valve 24, an accumulator 25 and a four-way valve 26 for switching the refrigerant flow. All of these component parts are connected by a refrigerant pipe 27. In the diagrams, numeral 28 designates a solenoid valve and numeral 29 an outdoor fan.

The outdoor heat exchanger 22 is adapted to function as a condenser in the cooling operation mode described later and as an evaporator in the heating operation mode described later. Also, the accumulator 25 is for separating the two-phase refrigerant from the cooling indoor heat exchanger 11 into a gas-phase refrigerant and a liquid-phase refrigerant and causes the gas-phase refrigerant to be taken into the compressor 21 in the cooling operation mode.

The compressor 21 absorbs, compresses and discharges the refrigerant when driven by an electric motor 30. The electric motor 30 is arranged in a hermetically sealed case integrally with the compressor 21, and has the rotational speed thereof variable continuously under the control of an invertor 31. The invertor 31 is energized and controlled by a control unit 40 (FIG. 3).

Figure 2:
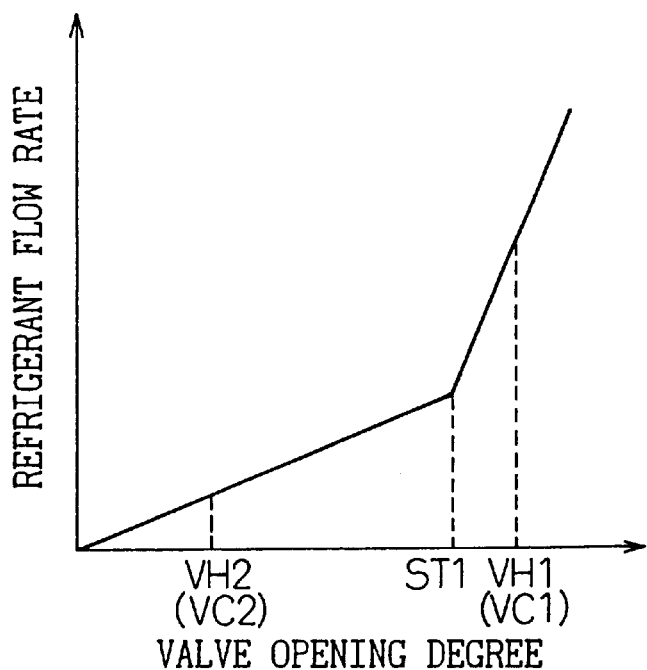
FIG. 2 is a characteristic diagram showing the relation between the valve opening degree of an electric expansion valve and the refrigerant flow rate according to the embodiments.

Both the cooling expansion valve 23 and the heating expansion valve 24 have the valve opening degree thereof adjusted by a stepping motor not shown. They are electric expansion valves with the valve opening degree thereof changeable and are energized and controlled by the control unit 40 (FIG. 3). The relation of the refrigerant flow rate with respect to the valve opening degree of the expansion valves 23, 24 is as shown in FIG. 2. The refrigerant flow rate increases with the increase in the valve opening degree of the heating expansion valve 24 along a curve of a predetermined inclination from VH2 to ST1, and along a curve of a larger inclination from the valve opening degree ST1 to VH1. For the cooling expansion valve 23, on the other hand, the increase is along a curve of a predetermined inclination from VC2 to ST1 and along a curve of a larger inclination from the valve opening degree ST1 to VC1.

The upper limit value VH1 is determined in accordance with the maximum internal load of the cabin during the heating, and the lower limit value VH2 is determined in accordance with the minimum internal load of the cabin during the heating. Also, the upper limit value VC1 is determined in accordance with the maximum internal load of the cabin during the cooling, and the lower limit value VC2 is determined in accordance with the minimum internal load of the cabin during the cooling.

Figure 3:
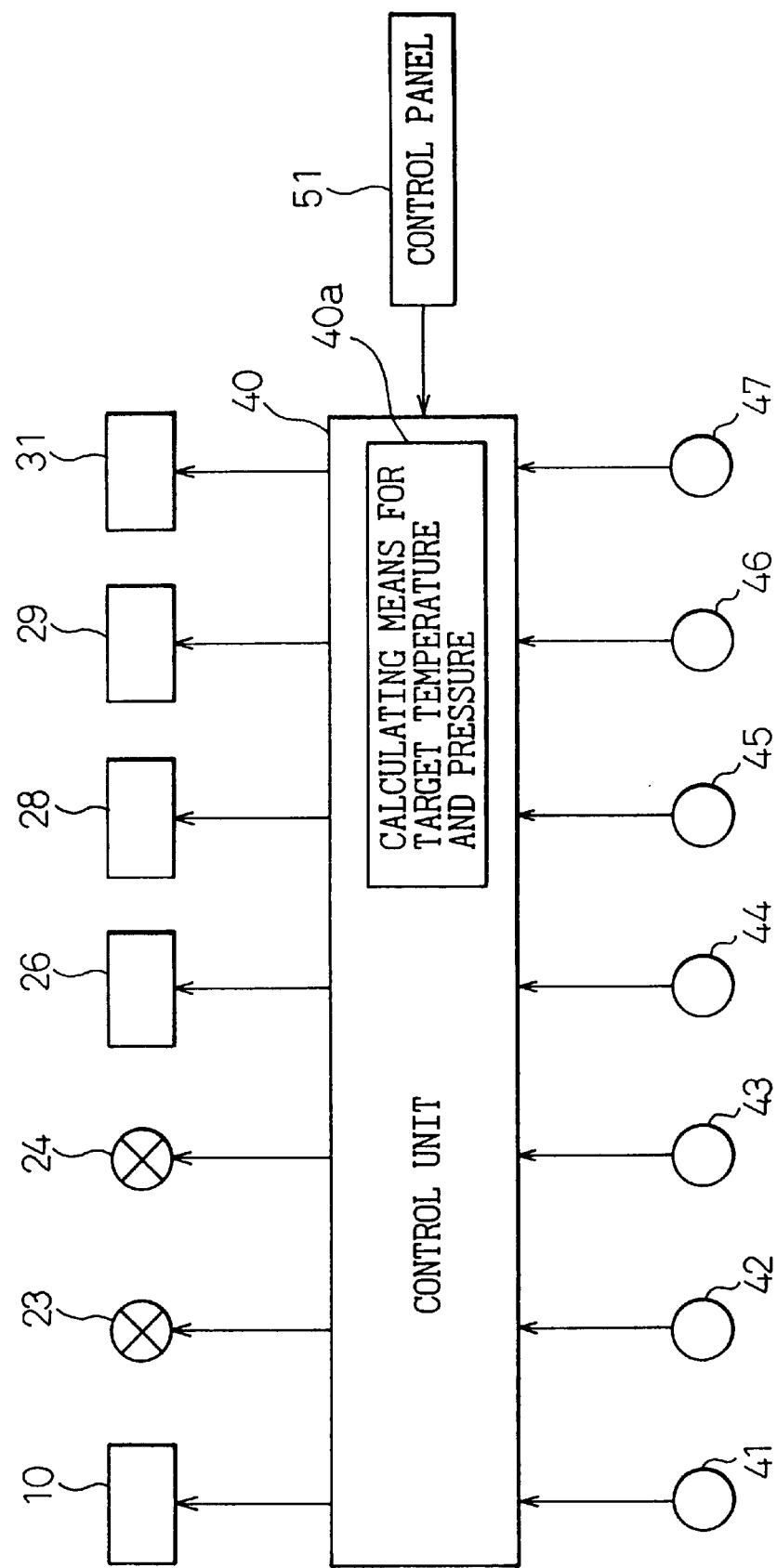
FIG. 3 is a block diagram showing a control system according to the embodiments.

The control unit 40 is supplied with signals from an external air temperature sensor 41 for detecting the atmospheric temperature as shown in FIG. 3, an air temperature sensor 42 for detecting the air temperature on the inlet side of the heating indoor heat exchanger 12 (specifically, the inlet side of the cooling indoor heat exchanger 11), a discharge pressure sensor 43 for detecting the pressure of the refrigerant discharged from the compressor 21, and an external heat exchanger outlet temperature sensor 44 for detecting the temperature of the refrigerant that has left the outdoor heat exchanger 22.

The control unit 40 is also supplied with signals from an indoor heat exchanger outlet temperature sensor 45 for detecting the temperature of the refrigerant that has left the heating indoor heat exchanger 12, a post-evaporator sensor 46 for detecting the air cooling degree (specifically, the temperature of the air immediately after passing through the heat exchanger 11) in the cooling indoor heat exchanger 11, and the levers and switches of the control panel 51 arranged on the internal front surface of the cabin.

The discharge pressure sensor 43 is arranged in the discharge pipe between the compressor 21 and the four-way valve 26. The outdoor heat exchanger outlet temperature sensor 44 is tightly fixed on the surface of the outlet pipe of the outdoor heat exchanger 22 by clamp or the like and covered with a heat insulating material or the like for assuring a smaller detection error of the refrigerant temperature. The indoor heat exchanger outlet temperature sensor 45 is also tightly fixed on the surface of the outlet pipe of the heating indoor heat exchanger 12 by a clamp or the like, and covered with a heat insulating material or the like to assure a low detection error of the refrigerant temperature.

Figure 4:
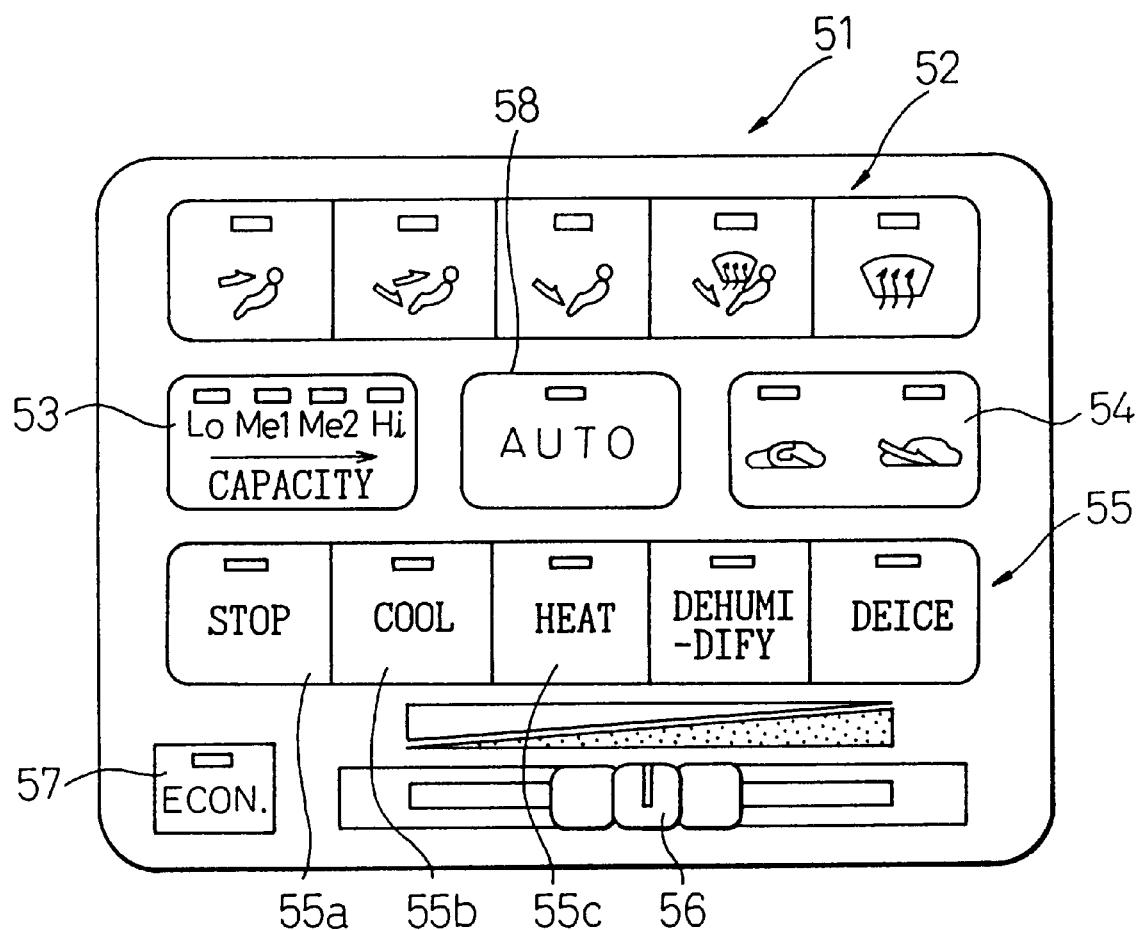
FIG. 4 is a front view of a control panel according to the embodiments.

The control panel 51 has arranged thereon a blowing mode setting switch 52 for setting each blowing mode as shown in FIG. 4, a capacity setting switch 53 for setting the capacity of air blown into the cabin, an internal-external air change-over switch 54 for setting the internal-external air switching mode, an operation mode setting switch 55 for setting the operation mode of the refrigeration cycle 20, a temperature setting lever 56 for setting the temperature of the air blown into the cabin, a power saving switch 57 for setting the mode for saving power consumption by the electric motor 30, and an auto switch 58 for automatically controlling the internal-external air switching mode, capacity, operation mode, blowing temperature and the blowing mode.

The operation mode setting switch 55 includes a stop switch 55a for stopping the operation of the compressor 21, a cooling switch 55b for setting the operation mode of the refrigeration cycle 20 to the cooling operation mode, and a heating switch 55c for setting the operation mode of the refrigeration cycle 20 to the heating operation mode.

The temperature setting lever 56 is for a cabin occupant to set a target blowing temperature into the cabin in manual operation mode. The control unit 40 determines a target temperature (target cooling degree) of the air cooling degree (specifically, the air temperature immediately after passing the heat exchanger 11) in the cooling indoor heat exchanger 11 in the cooling operation mode, and determines a target pressure of the air heating degree (the discharged refrigerant pressure of the compressor 21) in the heating operation mode, in accordance with the set position of the lever 56 by the target temperature and the target pressure calculation means 40a shown in FIG. 3.

The control unit 40 controls an invertor 31 for assuring that the detection value of the post-evaporator sensor 46 represents the above-mentioned target value in the cooling operation mode, and for assuring that the detection value of the discharge pressure sensor 43 attains the above-mentioned target value in the heating operation mode.

The control unit 40 of FIG. 3 has arranged therein a well-known microcomputer including a CPU, a ROM, a RAM, etc. not shown. The signals from the sensors 41 to 46 and the control panel 51 are applied to the microcomputer through an input circuit not shown in the ECU.

The microcomputer executes a predetermined process described later and, based on the result of the processing, controls the blower motor 10, the cooling expansion valve 23, the heating expansion valve 24, the solenoid valve 28, the outdoor fan 29 and the invertor 31. The control unit 40 is supplied with power from a battery not shown when the key switch not shown of the vehicle is turned on.

When an occupant of the cabin turns on the cooling switch 55b, the microcomputer starts the compressor 21 while at the same time controlling the four-way valve 26 and the solenoid valve 28. The refrigeration cycle 20 thus enters the cooling operation mode during cooling. In this mode, the refrigerant is circulated from the compressor 21 to the outdoor heat exchanger 22 to the cooling expansion valve 23 to the cooling indoor heat exchanger 11 to the accumulator 25 to the compressor 21.

When an occupant turns on the heating switch 55c, on the other hand, the microcomputer starts the compressor 21 while at the same time controlling the four-way valve 26 and the solenoid valve 28. The refrigeration cycle 20 thus enters the heating operation mode during heating. In this mode, the refrigerant circulates from the compressor 21 to the heating indoor heat exchanger 12 to the heating expansion valve 24 to the outdoor heat exchanger 22 to the solenoid valve 28 to the accumulator 25 to the compressor 21.

Now, the process for controlling the expansion valves 23, 24 by the microcomputer will be explained with reference to FIGS. 5 and 6.

Figure 5:
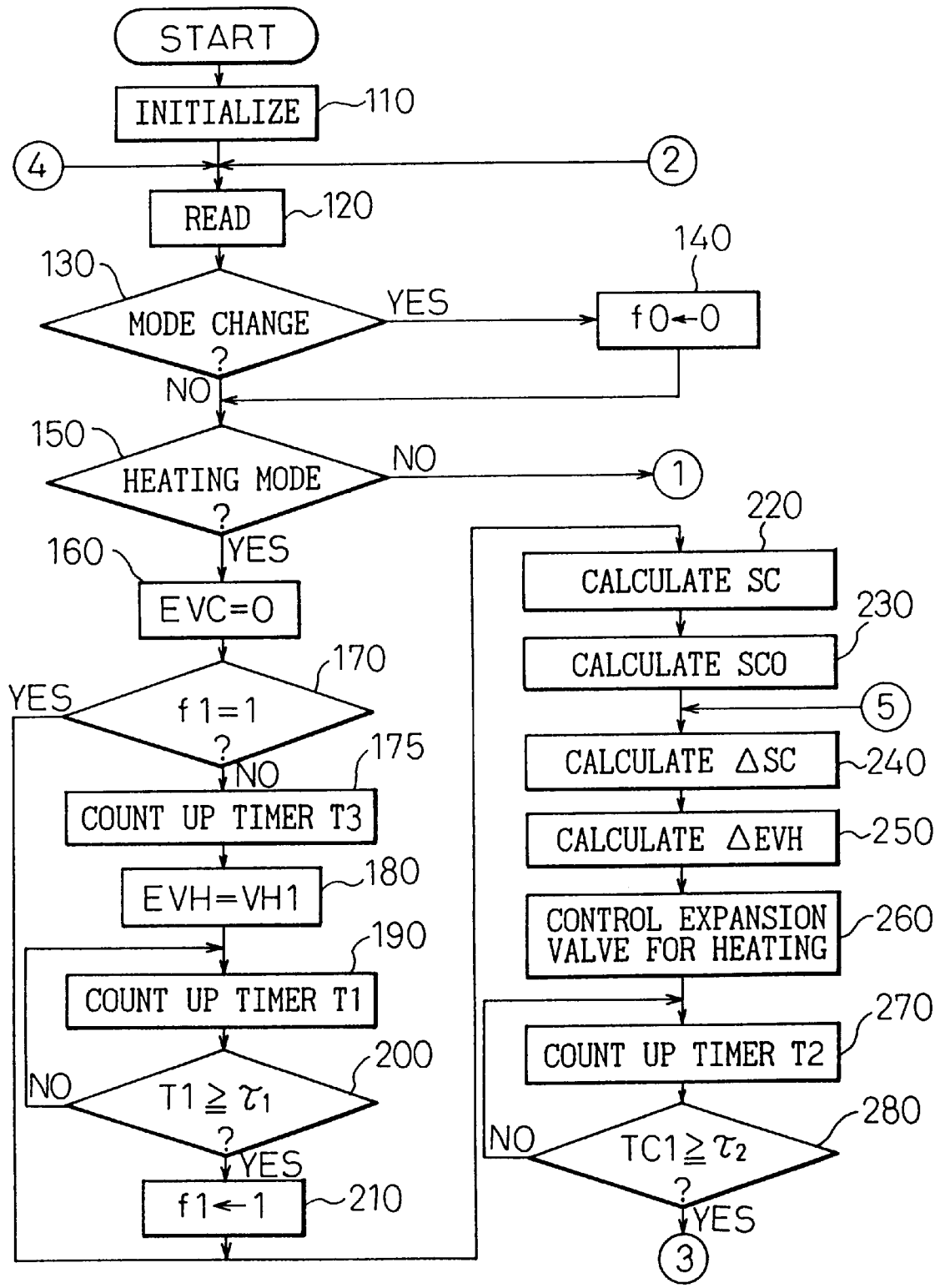
FIG. 5 is a flowchart showing the steps of the process for controlling the electric expansion valve according to the embodiments.
Figure 6:
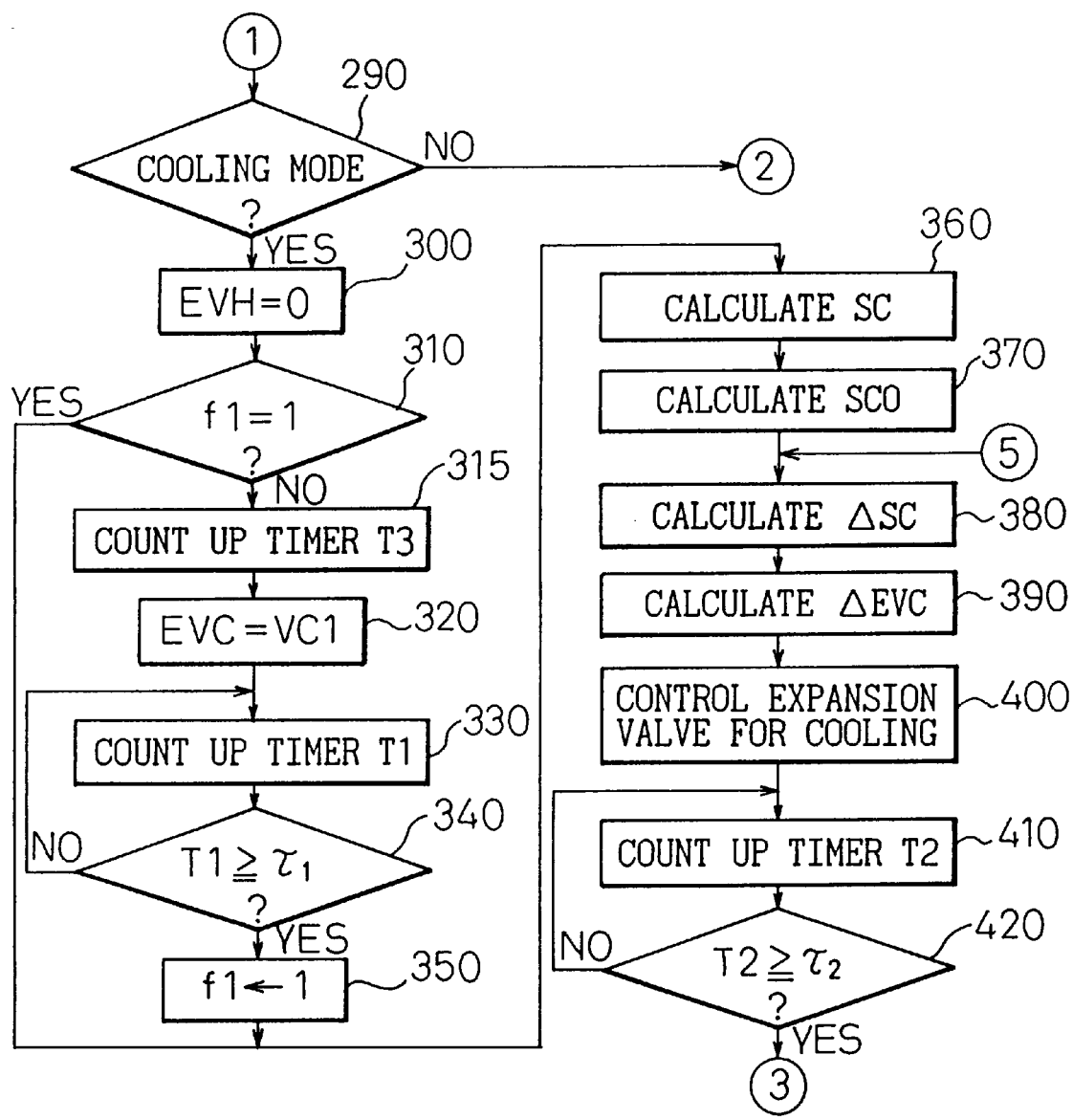
FIG. 6 is a flowchart showing the steps of the process for controlling the electric expansion valve according to the embodiments.

First, when the key switch is turned on and power is supplied to the control unit 40, the routine of FIGS. 5, 6 is started. In the first step S110, the system is initialized by resetting all elements including a flag f and timers T1, T2, T3, T4. In step S120, the signals are read in from the the sensors 41 to 46 and the levers and switches on the control panel 51.

Step S130, based on the signal from the operation mode setting switch 55, decides whether the operation mode of the refrigeration cycle 20 has changed or not. In the case where the decision is that the operation mode has changed, the flag f0 is set to 0 in step S140, while when there is no change, the process proceeds to step S150 where the heating switch 55c is checked whether it has turned on or not to decide whether the heating operation mode is prevailing or not.

When the decision in step S150 is negative, on the other hand, the process jumps to step S290 in FIG. 6 and decides whether the cooling switch 55b is turned on or not to see whether the cooling operation mode is prevailing. When the decision is negative, i.e. when neither the cooling switch 55b nor the heating switch 55c is on, the process returns to step S120 of FIG. 5. In the case where the decision is affirmative, on the other hand, the valve opening degree EVH of the heating expansion valve 24 is reduced to zero in step S300. In other words, the valve opening degree EVH is set to closed-up state.

Step S310 decides whether or not the flag f1 is set to "1", and thus decides whether the process of steps S320 to S340, described later, has been completed. When the flag f1 is set to "1", i.e. when the decision is that the process of steps S320 to S340 is completed, then the process jumps to step S360 directly. In the case where the decision in step S310 is that the process of steps S320 to S340 has not yet been executed, on the other hand, the process first proceeds to step S315 to count up a timer T3 followed by proceeding to steps S320 to S340 to hold the valve opening degree EVC of the cooling expansion valve 23 at the upper limit value VC1 for the predetermined time $\tau_1$.

Specifically, first, the EVC is set to the upper limit value VC1 in step S320. Then, the timer T1 is counted up in step S330, followed by step S340 for deciding whether the timer T1 has exceeded the predetermined time $\tau_1$ or not. If the decision is that the predetermined time $\tau_1$ has not been exceeded, the process again returns to step S330, while if the decision is that the predetermined time $\tau_1$ has been exceeded, the flag f1 is set to "1" in step S350 and the process proceeds to step S360.

In step S360, the theoretical supercooling degree SC of the condensed liquid refrigerant in the outdoor heat exchanger 22 is calculated according to equation (1) below.

$$SC = T(Pd) - Tos \quad (1)$$

where Tos is the detection value of the outdoor heat exchanger outlet temperature sensor 44, and T(Pd) is the condensation temperature calculated from the detection value of the discharge pressure sensor 43.

Specifically, the discharge refrigerant pressure detected by the discharge pressure sensor 43 represents the pressure at point A on the Mollier chart (FIG. 7) of the refrigeration cycle 20. This pressure is substantially equal to the pressure at point B. In this way, the pressure at point B is determined from the detection value of the discharge pressure sensor 43. According to this embodiment, therefore, the condensation temperature at point B is determined from a map indicating the relation between the refrigerant condensation pressure and the condensation temperature not shown but stored in the ROM. That is, T(Pd) as described above.

Figure 7:
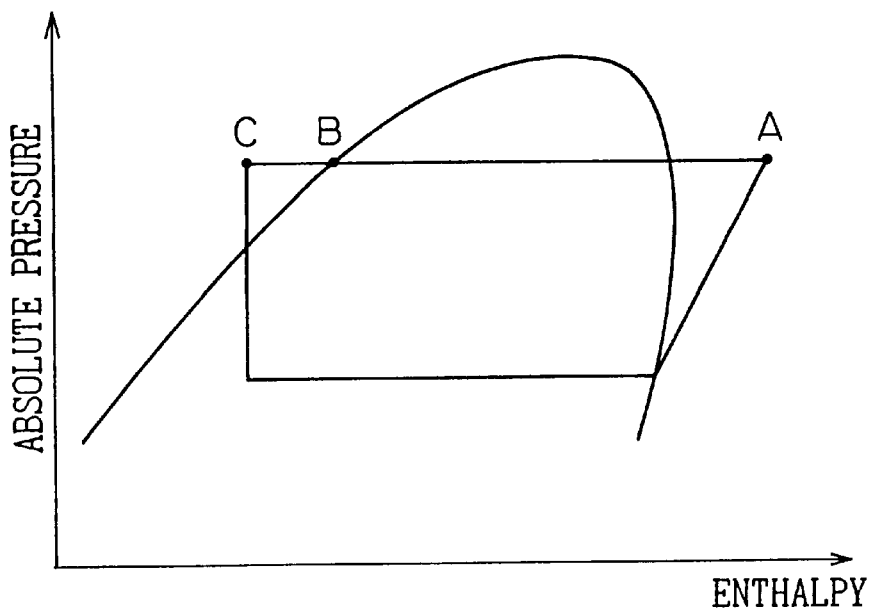
FIG. 7 is a Mollier chart of the refrigeration cycle according to the embodiments.

Also, the refrigerant temperature detected by the outdoor heat exchanger outlet temperature sensor 44 represents the refrigerant temperature at point C in FIG. 7. According to this embodiment, therefore, the difference between the refrigerant temperature at point B and the refrigerant temperature at point C in FIG. 7, i.e. the theoretical supercooling degree SC, is calculated according to equation (1).

In step S370, the target supercooling degree SCO providing a target value of the supercooling degree is calculated in such a manner as to maximize the efficiency of the refrigeration cycle 20 and thereby reduce the power consumption. Specifically, the radiation capacity Q of the outdoor heat exchanger 22 is optimized while at the same time maximizing the cooling coefficient of performance (COP) (hereinafter, the cooling COP is regarded as equal to the radiation capacity Q divided by the power W of the compressor 21).

Figure 8:
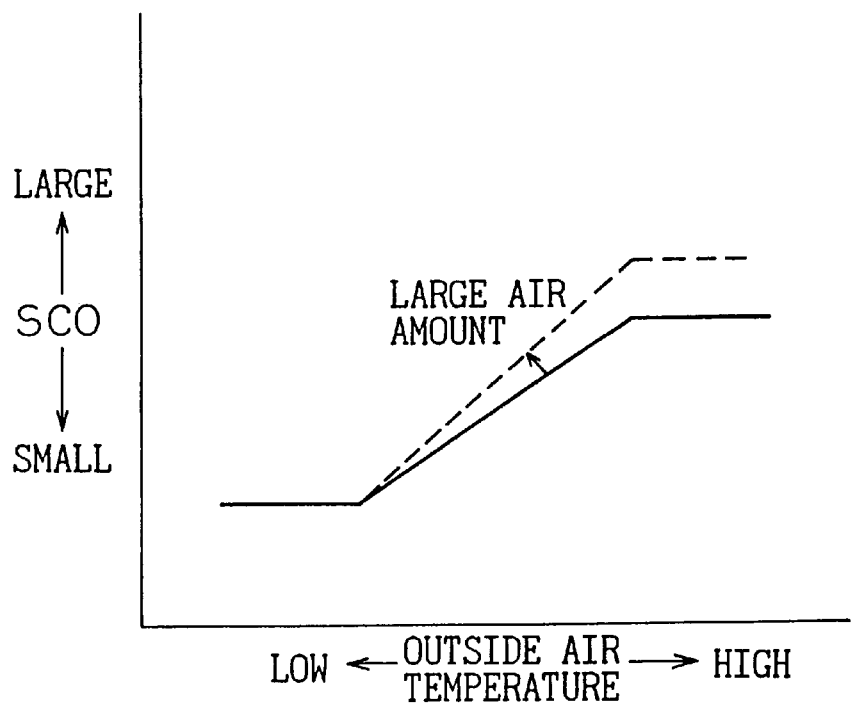
FIG. 8 is a map showing the relation between each environmental factor and a target supercooling degree SCO in the cooling operation mode according to the embodiments.
Figure 9:
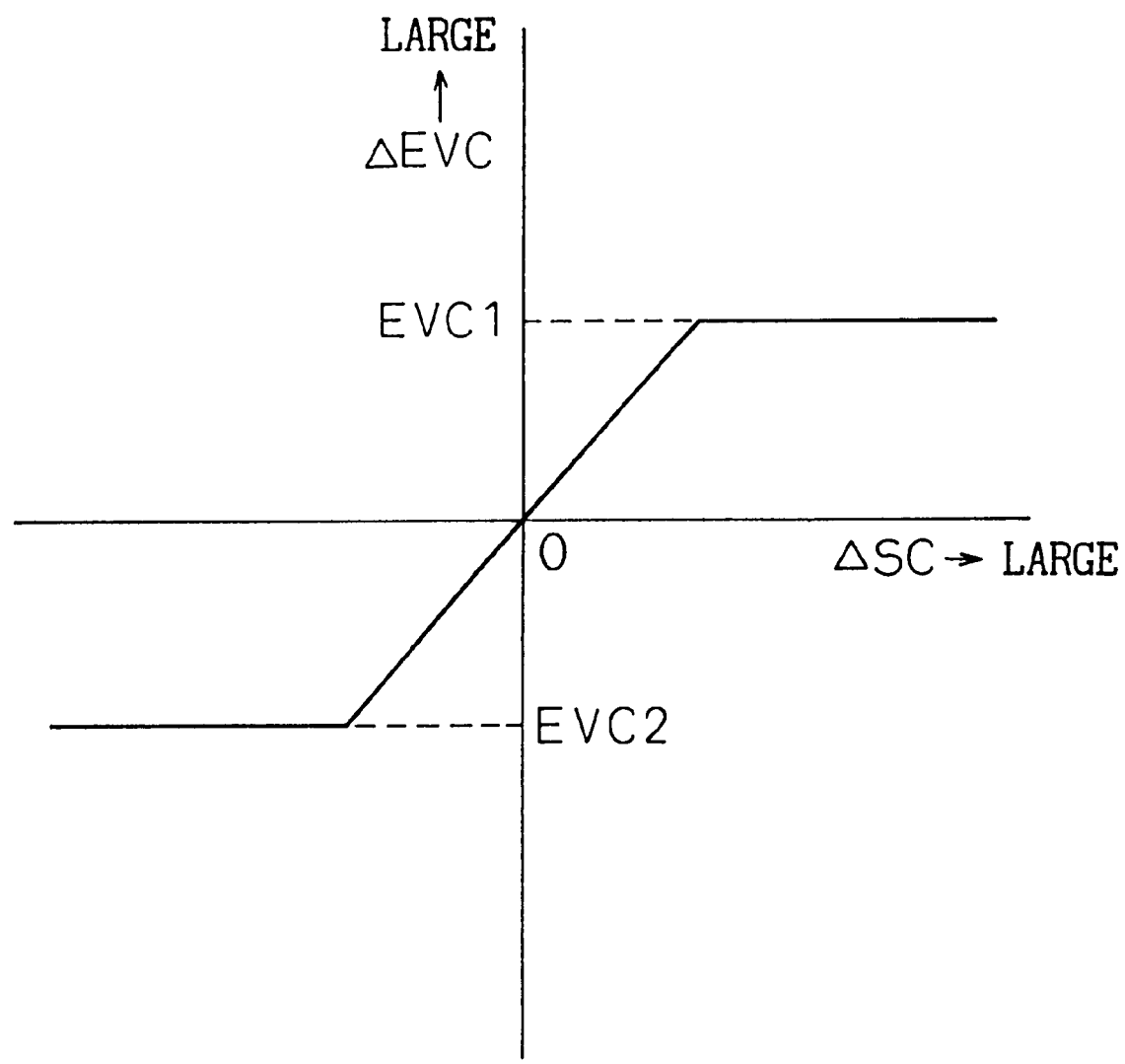
FIG. 9 is a map showing the relation between the deviation ΔSC and the opening degree change AEVH of the cooling expansion valve in the cooling operation mode according to the embodiments.
Figure 10:
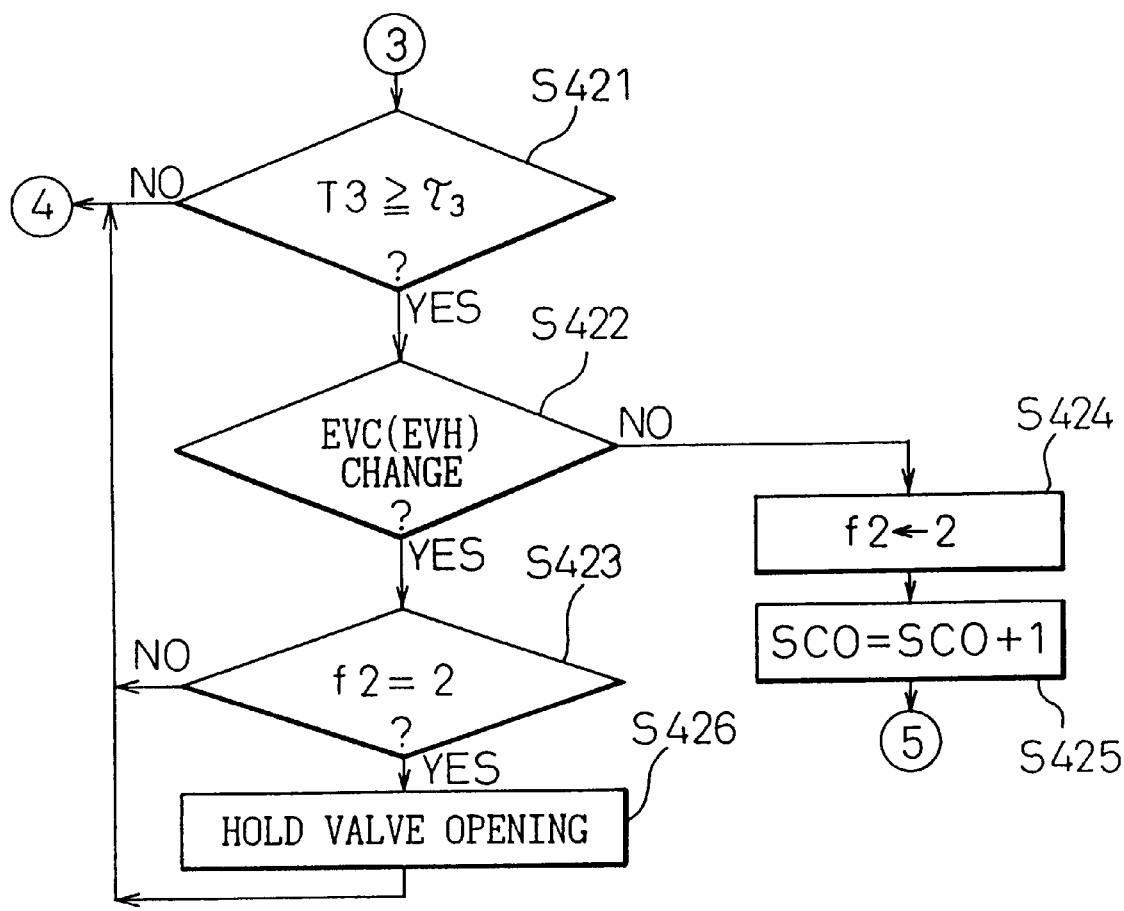
FIG. 10 is a flowchart showing the steps of the process for controlling the electric expansion valve according to the embodiments.

As shown in FIG. 8, the target supercooling degree SCO is calculated as a larger value, the higher the atmospheric temperature detected by the atmospheric temperature sensor 41 and the larger the capacity of air passing through the cooling indoor heat exchanger 11.

Specifically, in the summer season, with a high atmospheric temperature, the need is higher for securing the cooling capacity by activating the compressor 21 for cooling the cabin. In such a case, the pressure is increased and so is the refrigerant temperature in the outdoor heat exchanger 22, resulting in a larger difference between the refrigerant temperature and the atmospheric temperature. In other words, the radiation capacity Q of the indoor heat exchanger 22 is increased.

Consequently, even when the power W of the compressor 21 is increased as a result of calculating SCO as a large value, the capacity Q is increased even more for a larger cooling COP. When the atmospheric temperature is high, therefore, the SCO is calculated as a larger value than when the atmospheric temperature is low.

Also, the larger the amount of air passing through the cooling indoor heat exchanger 11, the larger the amount of heat absorbed in the heat exchanger 11, leading to a larger radiation amount of the outdoor heat exchanger 22. Even if the power W is increased as a result of calculating SCO as a large value, therefore, the capacity Q increases even more for a larger cooling COP. In such a case, therefore, the SCO is calculated as a large value.

In step S380, the deviation $\Delta SC$ (=SC–SCO) between the theoretical supercooling degree SC and the target supercooling degree SCO is calculated. After that, in step S390, the valve opening degree change $\Delta EVC$ of the cooling expansion valve 23 corresponding to the deviation $\Delta SC$ is calculated from the map of FIG. 9 stored in the ROM.

Then, in step S400, the valve opening degree of the cooling expansion valve 23 is increased or decreased by $\Delta EVC$. After that, in step S410, the timer T2 is counted up, followed by step S420 for deciding whether the timer T2 has exceeded a predetermined time $\tau_2$. In the case where the decision is that the timer T2 has not exceeded $\tau_2$, the process is returned to step S410 and after the lapse of the predetermined time $\tau_2$, the process jumps to the flowchart of FIG. 10.

In step S421, the compressor 21 is activated to drive the refrigeration cycle 20 (starts the cooling operation mode), and it is decided whether or not the timer T3 started in step S315 (the timer T3 started in step S175 described later) has passed a predetermined time $\tau_3$ or not. In the case where the decision is that the timer T3 has not passed the predetermined time $\tau_3$, the process returns to step S120.

In the case where the decision in step S421 is that the timer T3 has passed the predetermined time $\tau_3$, on the other hand, step S422 decides whether or not the change amount of the valve opening degree EVC relative to the upper limit value VC1 is smaller than a predetermined value (the change amount is zero in this case), i.e. whether the valve opening degree EVC has changed from the upper limit value VC1. In other words, in step S422, in the absence of a change in the valve opening degree, as described above with reference to the means for solving the problems, the detection values of the outdoor heat exchanger outlet temperature sensor 44 and the discharge pressure sensor 43 have a large error, and the process decides whether the theoretical supercooling degree SC is larger than the actual supercooling degree SC'.

In the case where there is substantially no error and the process is normal, the process proceeds to step S423 for deciding whether the flag f2 is set to "2". If the decision is that the flag f2 is not set to "2", the process returns to step S120. Then, the supercooling degree is controlled properly in steps S360 to S400. Also, once step S423 decides that the flag f2 is set to "2", the process proceeds to step S426 thereby to hold the prevailing valve opening degree.

In controlling the supercooling degree to a proper value as described above, the valve opening degree EVC is controlled in the following manner.

The valve opening degree EVC of the cooling expansion valve 23 is set to the upper limit value VH1 in step S180, and the control unit 40 employs this value as an initial position. Generally, when the cooling load in the cabin is decreased as the refrigeration cycle 20 starts, the heat absorption can be decreased and therefore the heat radiation can also be decreased. Thus, in this case, the SCO is calculated at a smaller value.

Figure 11:
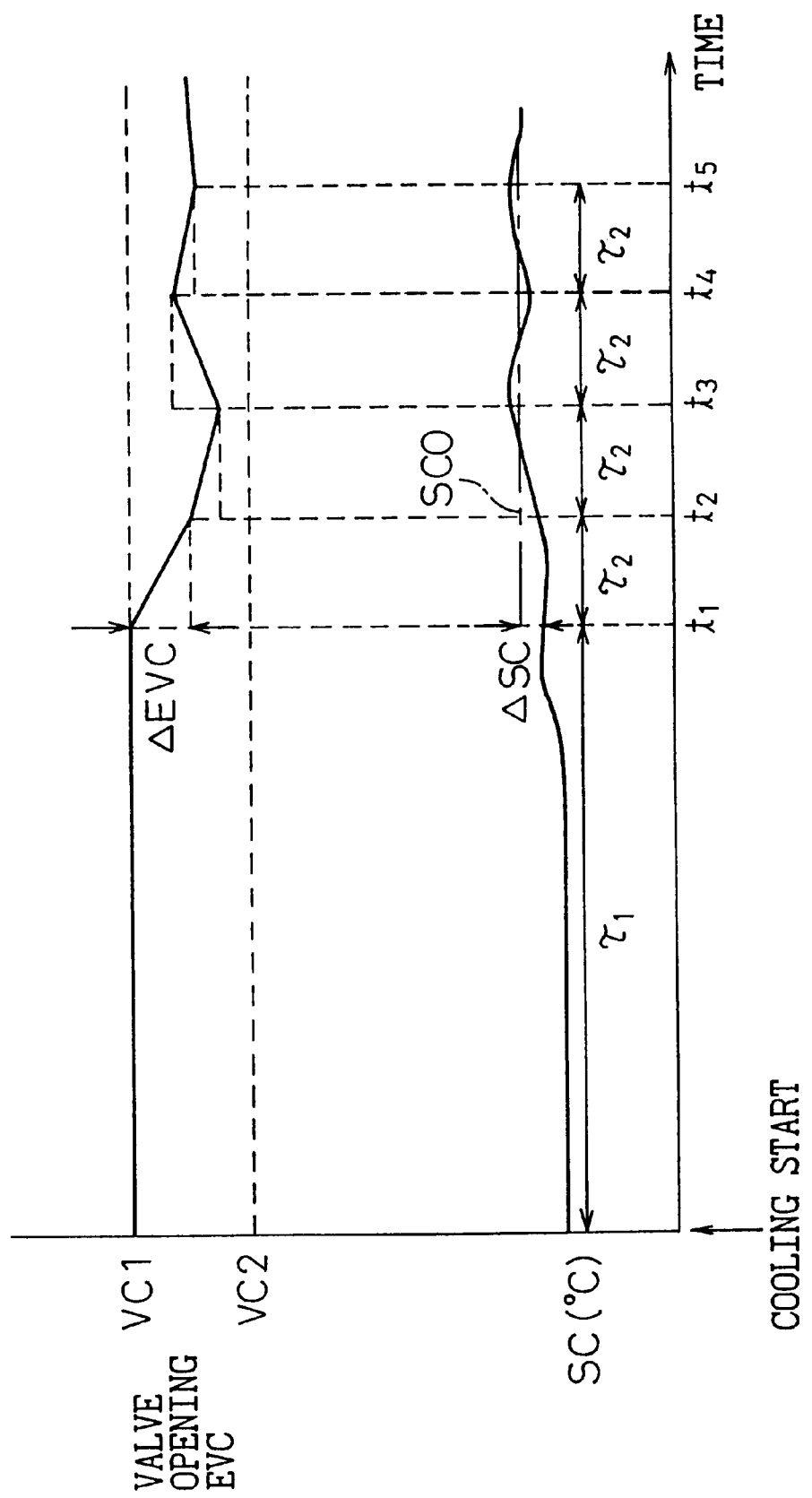
FIG. 11 is a timing chart of the valve opening degree EVC according to the first embodiment.

As a result, the valve opening degree EVC is reduced as compared with the upper limit value VC1. Also, the valve opening degree EVC of the cooling expansion valve 23, which is set to the upper limit value VC1 in step S320, is generally decreased as compared with the upper limit value VC1. The time chart for this operation is as shown in FIG. 11 from which it can be seen that the proper control of supercooling degree is possible.

Whether the valve opening degree EVC has changed or not is determined in the following manner.

Once the the valve opening degree EVC is set to the upper limit value VC1, the control unit 40 recognizes the valve opening degree VC1 in this state as an initial position. Further, the control unit 40, which recognizes the direction of driving the stepping motor for driving the cooling expansion valve 23 in accordance with the positive or negative value of ΔEVC calculated in step S390, can determine that the valve opening degree EVC is decreased and the valve opening degree EVC has changed.

Figure 12:
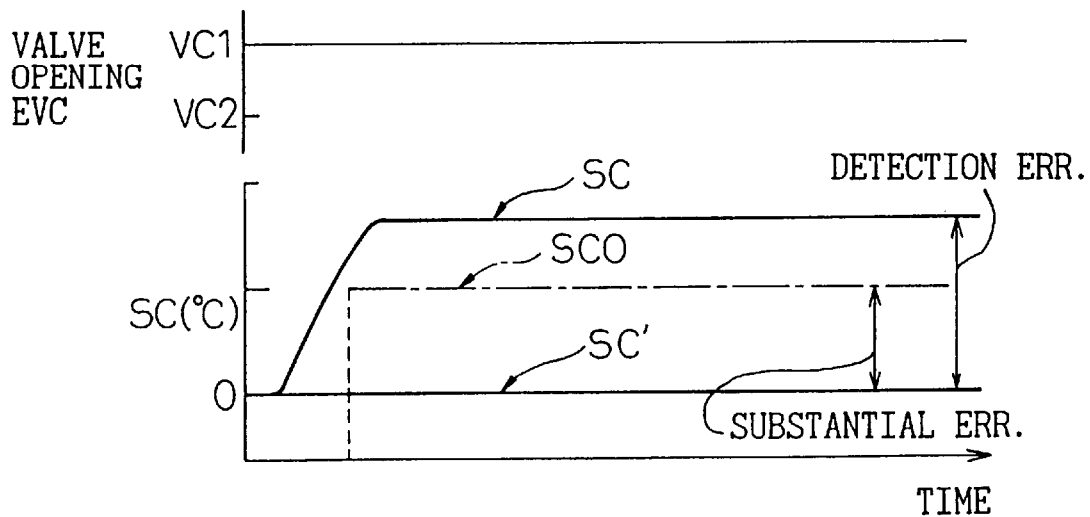
FIG. 12 is a diagram showing the behavior of the valve opening degree according to the prior art.

Depending on the vehicle type, step S422 may decide that the valve opening degree EVC remains unchanged with a large error of the detection values of the sensors 43 and 44. In this way, in the case where the theoretical supercooling degree SC is higher than the actual supercooling degree SC' as shown in FIG. 12, therefore, a large error develops as shown in the drawing. As a result, in spite of an attempt which may be made to increase the valve opening degree EVC for securing the theoretical supercooling degree SC as near to the target supercooling degree SCO as possible in FIG. 12, the fact that the valve opening degree EVC originally assumes the upper limit value VC1 keeps the valve opening degree VHC unchanged at the upper limit value VC1. Thus, as shown in FIG. 12, the actual refrigeration cycle 20 is operated inefficiently with a dryness of not more than 0° C. in supercooling degree while the actual supercooling degree SC' remains unchanged.

For this reason, according to this example, the following process is performed. Upon a decision in step S422 that the valve opening degree VHC remains unchanged, the process proceeds to step S424. In step S424, the flag f is set to "2", followed by proceeding to step S425. Step S425 calculates a new SCO corrected by adding a predetermined supercooling degree (1° C.) to the SCO calculated in step S370. In step S390, ΔEVC is calculated as described above based on the corrected SCO. Further, the valve opening degree EVC is controlled in step S400. The operation associated with this process will be described in detail later.

When the decision in step S150 is affirmative, i.e. when the heating operation mode is involved, in contrast, the following process is executed. First, in step S160, the valve opening degree of the cooling expansion valve 23 (hereinafter referred to as EVC) is set to zero. In other words, the cooling expansion valve 23 is closed up. Step S170 decides whether the flag f1 is set to "1", and thus decides whether the process of steps S180 to S200 described later has been executed or not.

In the case where the decision is that the flag f1 is set, i.e. the process of steps S180 to S200 are already executed, the process directly jumps to step S220. In the opposite case, steps S180 and S200 hold the valve opening degree (hereinafter referred to as EVH) of the heating expansion valve 24 at a predetermined upper limit VH1 for a predetermined time length $\tau_1$. In other words, during the predetermined time $\tau_1$ after the compressor 22 is driven to start the refrigeration cycle 20, a predetermined initial opening degree, i.e. the upper limit value VH1 is maintained. The predetermined time $\tau_1$ is set as a time length before the load of the compressor 21 that has increased in the initial stage of starting the air-conditioning system decreases to some lower level.

Specifically, the EVH is set to the upper limit value VH1 in step S180. In step S190, the timer T1 is counted up, followed by step S200 for deciding whether the timer T1 has exceeded the predetermined time $\tau_1$. When the decision is negative, the process returns to step S190, while if the decision is affirmative, the flag f1 is set to "1" in step S210 and the process proceeds to step S220.

In step S220, the supercooling degree of the refrigerant of the condensed liquid in the heating indoor heat exchanger 12 (hereinafter referred to as the SC) is calculated according to the following equation (2).

$$SC = T(Pd) - Tcs \qquad (2)$$

where T(Pd) is the condensation temperature calculated from the detection value of the discharge pressure sensor 43, and Tcs is the detection value of the indoor heat exchanger outlet temperature sensor 45.

In step S230, the target value of the supercooling degree (hereinafter referred to as the SCO) is calculated to maximize the efficiency of the refrigeration cycle 20 to save the electric power. Specifically, the radiation capacity Q of the heating indoor heat exchanger 12 is optimized while at the same time maximizing the heating COP (=radiation capacity Q divided by power W of compressor 21) of the refrigeration cycle 20.

Figure 13:
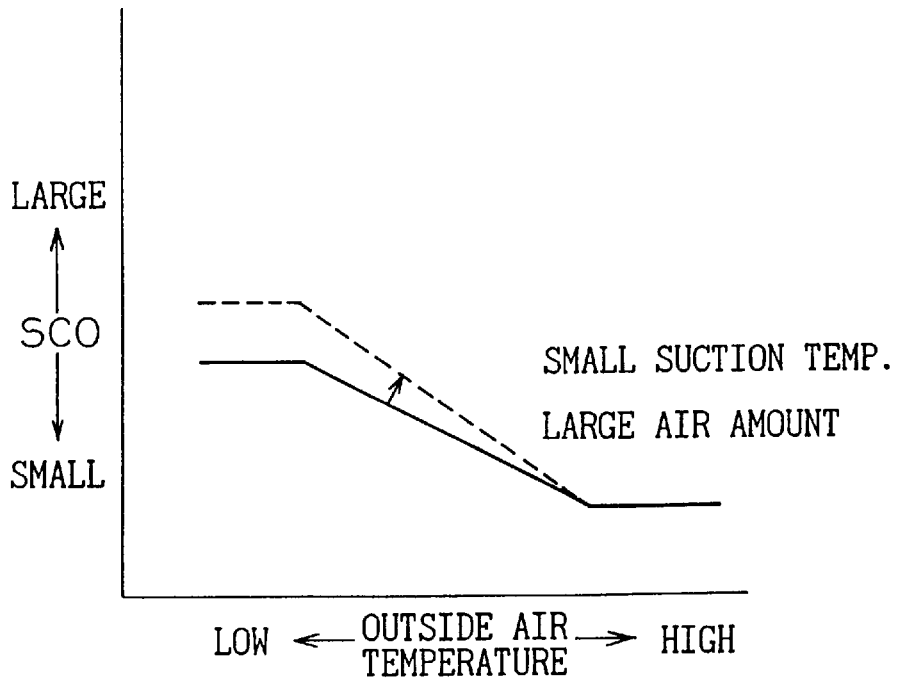
FIG. 13 is a map showing the relation between the environmental factors and the target supercooling degree SCO in the heating operation mode according to the embodiments.
Figure 14:
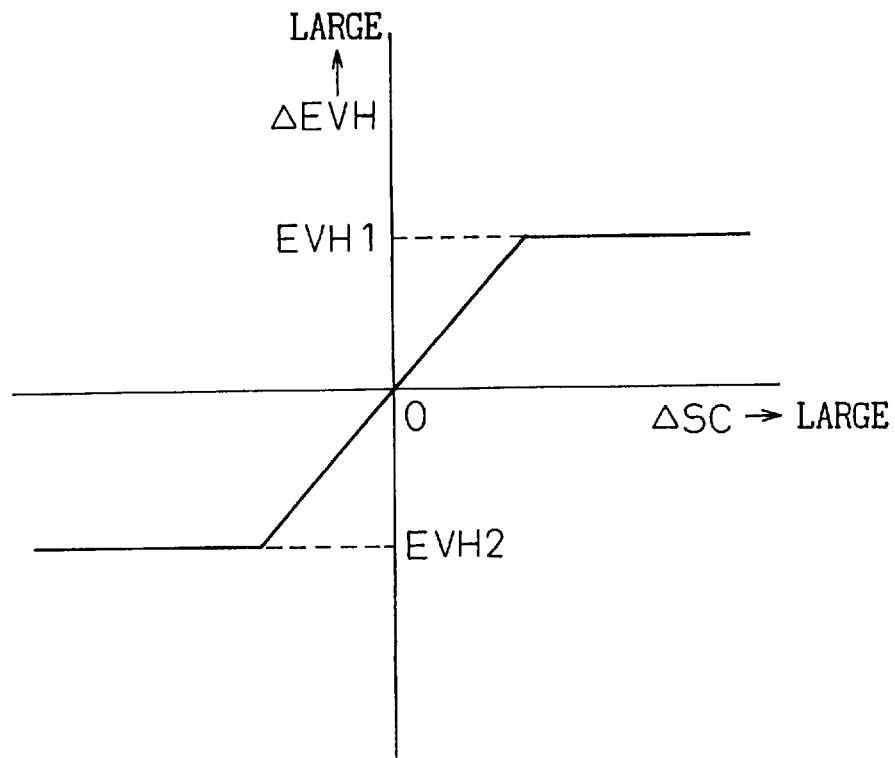
FIG. 14 is a map showing the relation between the deviation ASC and the opening degree change AEVH of the heating expansion valve in the heating operation mode according to the embodiments.

The SCO is calculated as a larger value, the lower the atmospheric temperature, or the lower the air temperature on the intake side of the heating indoor heat exchanger 12 or the larger the capacity of air passing through the heat exchanger 12, as shown in FIG. 13, based on the signals of the atmospheric air temperature sensor 41, the intake temperature sensor 42 and the air capacity setting switch 53 read in step S120.

Specifically, in the winter season when the atmospheric temperature is low, the atmospheric air introduction mode is employed normally for the purpose of defogging. In such a case, therefore, the lower the atmospheric temperature, the lower the air temperature on the intake side of the heating indoor heat exchanger 12. In other words, the temperature of the air passing through the heat exchanger 12 is reduced. In this way, the fact that the temperature of the air passing through the heat exchanger 12 is low is indicative of a large difference between the temperature of the refrigerant in the heat exchanger 12 and the temperature of the air passing therethrough, i.e. a large radiation capacity Q.

Even when the SCO is calculated as a large value with the result that the power W is increased, the capacity Q is increased even more for a larger heating COP. When the atmospheric temperature or the intake air temperature is low as described above, therefore, the SCO is calculated as a larger value than when these temperatures are high.

On the other hand, the larger the capacity of air passing through the heat exchanger 12, the lower the pressure. The pressure is originally lower when the air capacity is high than when the air capacity is low. Even if the power W is increased when the capacity Q is increased by calculating the SCO as a large value, therefore, the small rate of increase in the power W increases the heating COP after all. Thus, the greater the capacity of air passing through the heat exchanger 12, the SCO is calculated as a larger value.

In step S240, the deviation ΔSC between the SC and SCO (=SC−SCO) is calculated. After that, in step S250, the valve opening degree change ΔEVH of the heating expansion valve 24 corresponding to the deviation ΔSC is calculated from the map of FIG. 14 stored in the ROM.

Then, in step S260, the valve opening degree of the heating expansion valve 24 is increased or decreased by ΔEVH. After that, in step S270, the timer T2 is counted up, followed by step S280 for deciding whether the timer T2 has exceeded a predetermined time $\tau_2$ or not. When the decision is negative, the process returns to step S270. In other words, before the timer T2 exceeds the predetermined time $\tau_2$, the valve opening degree EVH of the heating expansion valve 24 is held. Once the decision is reached that the timer T2 has exceeded the predetermined time $\tau_2$, the process jumps to the flowchart of FIG. 10 to perform the above-mentioned process. Step S422 decides whether the valve opening degree EVH has changed or not.

Now, the specific operation based on the control process of the microcomputer will be explained with reference to the timing chart of FIG. 15. In this case, the heating operation mode and the cooling operation mode will be explained collectively. The explanation that follows assumes that the cooling operation mode and the heating operation mode are not switched to each other after starting the air-conditioning system by turning on the key switch and the operation mode setting switch 55. Further, the predetermined time $\tau_2$ is not taken into account.

Until after the lapse of the predetermined time $\tau_1$ following the activation of the air-conditioning system and starting the refrigeration cycle 20, the valve opening degree EVC of the cooling expansion valve 23 is fixed to VC1 in the cooling operation mode or the valve opening degree EVH of the heating expansion valve 24 is fixed to VH1 in the heating operation mode. In this way, the high pressure is prevented from being abnormally increased at the time of activating the air-conditioning system and the efficiency of the refrigeration cycle 20 from being deteriorated while at the same time securing the refrigerant circulation amount for an improved starting characteristic of the refrigeration cycle 20.

In the process during which the refrigeration cycle 20 has been started from stationary state, the condensation temperature and the high pressure increase while the theoretical supercooling degree gradually rises.

Figure 15:
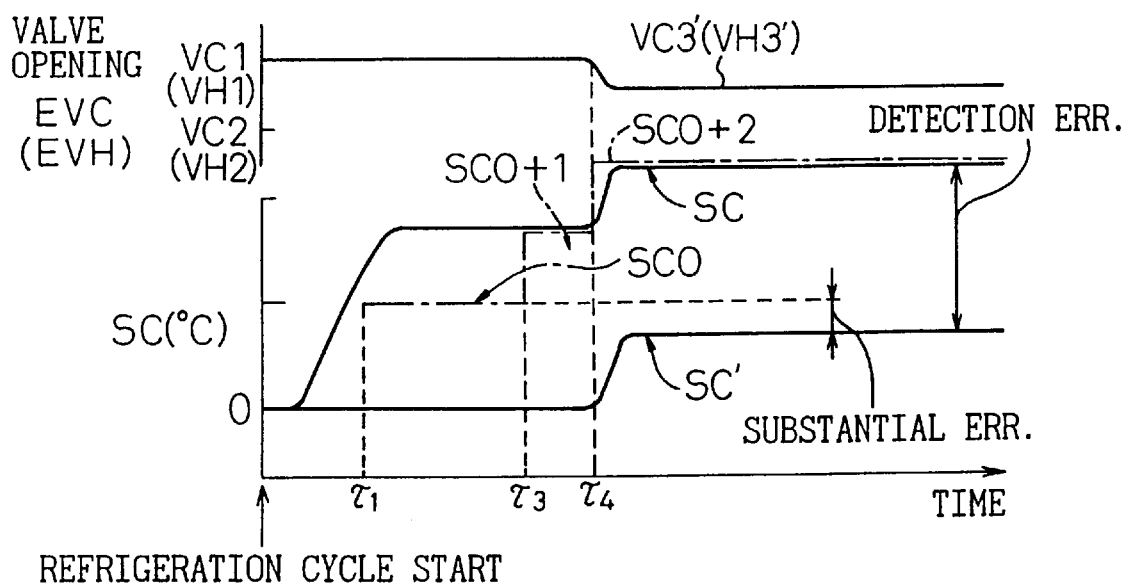
FIG. 15 is a timing chart for the electric expansion valve according to the first embodiment.

Upon the lapse of the predetermined time $\tau_1$ when the target supercooling degree SCO is calculated, the theoretical supercooling degree SC as of time point $\tau_1$ is also calculated and is larger than the target supercooling degree SCO in the case of FIG. 15, so that ΔSC assumes a positive value. As seen from FIG. 9, therefore, ΔEVC also assumes a positive value. As a result, the valve opening degree EVC (EVH) should be controlled upward. Since the valve opening degree EVC (EVH) has thus far remained at the upper limit value VC1 (VH1), however, the valve opening degree EVC (EVH) undergoes no change and continues to remain at the upper limit value VC1 (VH1).

After the lapse of the predetermined time $\tau_3$ following the activation of the air-conditioning system, the decision is made in step S422 that the valve opening degree EVC (EVH) remains unchanged. Then, SCO is corrected and 1° C. is added as a predetermined supercooling degree in step S425. In other words, SCO is corrected by adding 1° C. to a predetermined supercooling degree. In other words, SCO is corrected and a corrected target supercooling degree is calculated in step S425. By doing so, in the case of FIG. 15, SCO is assumed to approach the theoretical supercooling degree SC and has become equal to the theoretical supercooling degree SC. Since ΔEVC (ΔEVH) is zero, however, the valve opening degree EVC (EVH) still remains at the upper limit value VC1 (VH1).

At time point $\tau_4$, for example, the process again proceeds to steps S422 to S425, where 1° C. is further added to SCO+1. At time $\tau_4$, the relation SCO+2 holds as compared SCO at the predetermined time $\tau_1$. In the case of FIG. 15, SCO+2 is larger than the theoretical supercooling degree SC, so that ΔEVC (ΔEVH) assumes a negative value. As a result, the valve opening degree EVC (EVH) decreases from the upper limit value VC1 (VH1) by a predetermined value and assumes a predetermined opening degree VC3' (VH3') constituting an intermediate opening degree. Thus, the actual supercooling degree SC' can depart from the state of zero dryness and can approach the target supercooling degree SCO calculated at the predetermined time $\tau_1$.

Consequently, when the theoretical supercooling degree SC is smaller than the actual supercooling degree SC', the deterioration of the efficiency of the refrigeration cycle 20 can be suppressed.

With this change of the valve opening degree EVC (EVH), the decision in step S422 becomes affirmative, and the process is passed to step S423. Since the flag is set to "2" in step S424, the decision in step S423 is affirmative, and the valve opening degree EVC (EVH) is held at a predetermined opening degree VC3' (VH3') in step S426. This state is held as long as the refrigeration cycle 20 is working, i.e. until the air-conditioning system stops from the cooling operation mode or the air-conditioning operation mode is switched between cooling operation mode and heating operation mode.

More specifically, in the cooling operation mode, for example, the theoretical supercooling degree SC is calculated in step S370 again after the valve opening degree EVC reaches the predetermined opening degree VC3', followed by step S390 for calculating ΔEVC from the theoretical supercooling degree SC and the target supercooling degree SCO. Then, in view of the fact that the theoretical supercooling degree SC is larger than the target supercooling degree SCO due to the above-mentioned error, ΔEVC assumes a positive value. As a result, the valve opening degree EVC again returns to the upper limit VC1 thereby to deteriorate the efficiency of the refrigeration cycle 20. According to this embodiment, once the valve opening degree EVC reaches the predetermined value VC3', this predetermined valve opening degree VC3' is held, thereby making it possible to continue to suppress the deterioration of the efficiency of the refrigeration cycle 20.

Second Embodiment

Figure 16:
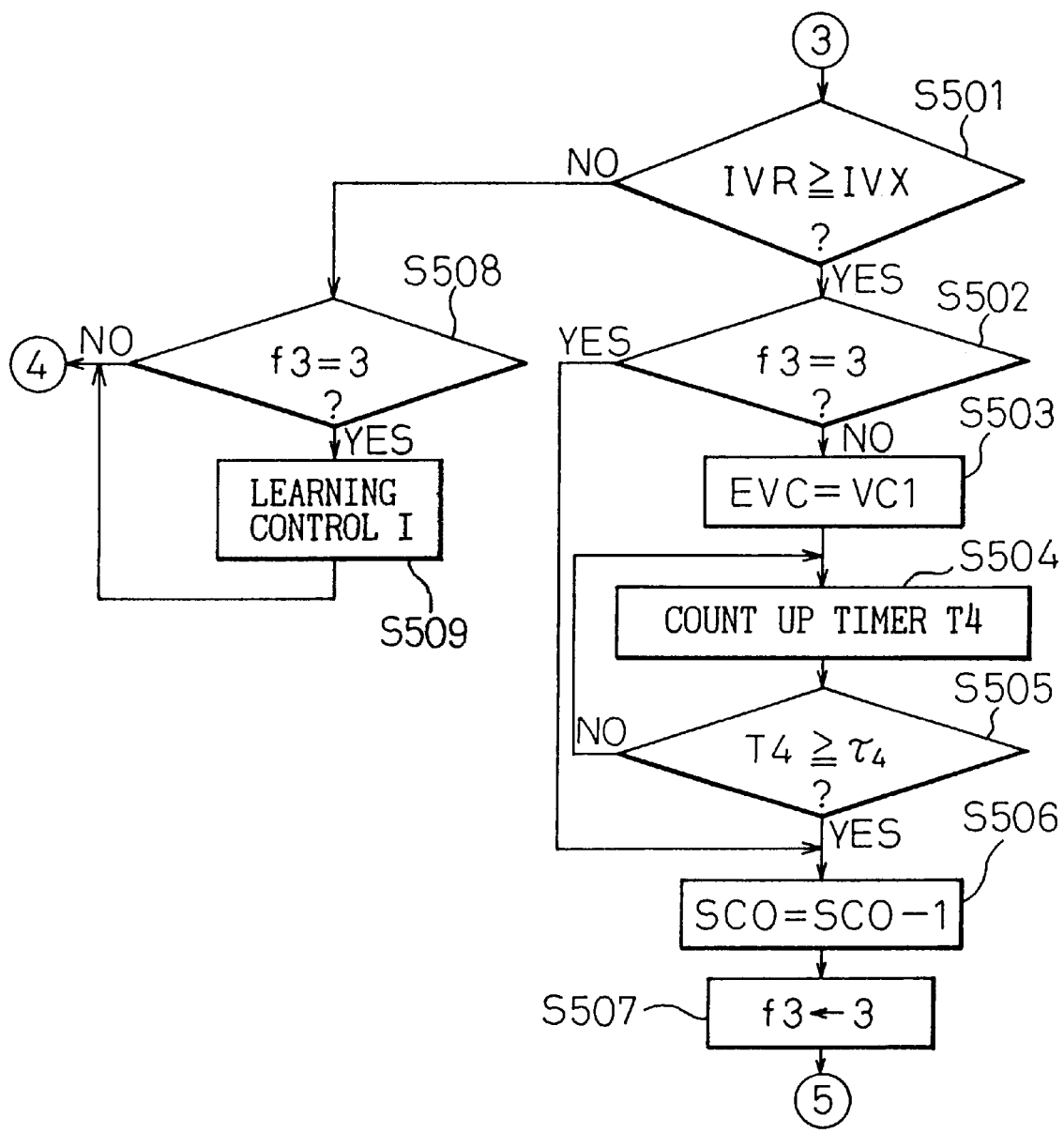
FIG. 16 is a flowchart showing the steps of the process for controlling the electric expansion valve according to the second embodiment.

In the first embodiment described above, a protective action is described which is taken in the case where the theoretical supercooling degree SC exceeds the actual supercooling degree SC'. This embodiment, on the other hand, represents a protective action taken in the case where, depending on the vehicle involved, the theoretical supercooling degree SC decreases to below the actual supercooling degree SC'. Such a protective action will be described below. The feature of this embodiment is represented in the flowchart of FIG. 16 corresponding to FIG. 10 of the first embodiment, in which the flowcharts of FIGS. 5 and 6 are connected by ③ to ⑤ in the first embodiment. Also, the following-described process is performed only in the cooling operation mode.

The valve opening degree EVC is controlled to assume a proper supercooling degree as described above and the process proceeds to step S501, which decides whether the rotational speed IVR of the compressor 21 is abnormal and exceeds a predetermined rotational speed IVX (8000 rpm). The rotational speed IVR is detected by use of a signal corresponding to the rotational speed of the compressor 21 in the invertor 31. For example, a line current from the invertor 31 to the electric motor 30 is used.

When step S501 decides that the rotational speed IVR is higher than the predetermined rotational speed IVX and the decision is affirmative, the process proceeds to step S502 for deciding whether the flag f3 is set to "3" or not. In other words, step S501 decides whether the theoretical supercooling degree SC is reduced below the actual supercooling degree SC' due to the above-mentioned error for the reason described later.

In the case where the decision in step S502 is negative, the process is passed to step S503 for switching the valve opening degree EVC to the upper limit value VC1. After that, the process proceeds to step S504 for counting up the timer T4. The next step S505 decides whether or not the timer T4 has exceeded a predetermined time $\tau_4$. If the decision is that the time $\tau_4$ is not exceeded, the process returns to step S504. In other words, the valve opening degree EVC is held at the upper limit value VC1 for the predetermined time $\tau_4$.

With the lapse of the predetermined time $\tau_4$ on the timer T4, the target supercooling degree SCO calculated in step S370 is corrected downward by a predetermined supercooling degree (1° C.) in step S506, and SCO-1 is newly calculated as a corrected supercooling degree. After that, the process proceeds to step S507 for setting the flag to "3".

Specifically, step S502 decides whether or not the rotational speed IVR has increased beyond the predetermined rotational speed IVX and the target supercooling degree SCO has been corrected downward by 1° C. of a predetermined supercooling degree. Until the decision in step S501 changes to negative, therefore, the corrected supercooling degree is corrected downward by 1° C. repeatedly in step S506.

When step S501 decides that the rotational speed IVR is lower than the predetermined rotational speed IVX, on the other hand, the process proceeds to step S508 for deciding whether the flag f3 is set to "3" or not. Specifically, step S508 decides whether the target supercooling degree SCO in step S370 has been corrected in step S506. In this way, it is determined whether the rotational speed IVR has changed from a state higher than the predetermined rotational speed IVX to a state lower than that. In the case where the rotational speed IVR remains lower than the predetermined rotational speed IVX after starting the refrigeration cycle 20, the decision in step S508 is negative, and the process returns to step S120.

The affirmative decision in step S508 is indicative of the fact that the rotational speed IVR has become higher than the predetermined rotational speed IVX, and due to this error, the theoretical supercooling degree SC is lower than the actual supercooling degree SC'. In such a case, the process proceeds to step S509 and learning control is excuted. That is, in step S509, the number of corrections is set to A (the result is A ° C. since the correction is 1° C. at a time), SCO calculated when the process proceeds to step S370 is set to SCO1, and SCO used for calculating ΔEVC in step S240 is set to SCO-A (Learning Control I). After that, the process returns to step S120.

Now, a specific operation based on the control unit of the microcomputer will be explained with reference to the timing chart of FIG. 16. The explanation that follows assumes that the cooling operation mode is continued after the air-conditioning system is started by turning on the key switch and the operation mode setting switch 55. Further, the predetermined time $\tau 2$ is not taken into account.

The air-conditioning system is activated, and the refrigeration cycle 20 is started. Before the time point t1 after the lapse of the time $\tau_1$ described above, the valve opening degree EVC is fixed to VC1. This period involves the state in which the refrigeration cycle 20 is activated from the stationary state. Thus, the condensation temperature and the high pressure increase, so that the theoretical supercooling degree SC gradually rises.

At the time point upon the lapse of the time $\tau_1$ described above, the target supercooling degree SCO is calculated. In the case of FIG. 16, the theoretical supercooling degree SC at time point $\tau_1$ is smaller than SCO and ΔSC assumes a negative value. As seen from FIG. 9, therefore, ΔEVC also assumes a negative value. As a result, the valve opening degree EVC is controlled downward at and after the time $\tau_1$, and the theoretical supercooling degree SC approaches SCO.

With the activation of the air-conditioning system, the control unit 40 controls the air temperature immediately after passing the indoor heat exchanger 11 (hereinafter called the post-evaporator temperature) to coincide with the target supercooling degree (hereinafter referred to as the post-evaporator target temperature). The rotational speed IVR of the compressor 21, therefore, gradually rises.

Assume that the valve opening degree EVC decreases and reaches a predetermined value at the time point $\tau_5$. Since the theoretical supercooling degree SC is smaller than the actual supercooling degree SC' due to the above-mentioned error, however, the valve opening degree EVC is excessively reduced, if set it is to the predetermined value described above. The result is that the proper supercooling degree is impossible to attain and the high pressure rises so high that an excessively large amount of the liquid refrigerant stays in the outdoor heat exchanger 22. Thus, the cooling heat exchanger 11 runs short of gas.

In such a case, the post-evaporator temperature increases beyond the post-evaporator target temperature and the rotational speed IVR continues to abnormally increase from time $\tau_1$ to even after time $\tau_5$. As a result, the power W of the compressor 21 increases to such an extent as to deteriorate the efficiency of the refrigeration cycle 20 further. A recommended protective action is increasing the valve opening degree EVC and somewhat reducing the actual supercooling degree SC'.

In view of this, according to this embodiment, the process of steps S503 to S505 is performed at the time point $\tau_5$ when the rotational speed IVR reaches the predetermined value IVX. Before controlling the valve opening degree EVC by performing the process of step S506, the valve opening degree EVC is changed upward and held at the upper limit value VC1 during a predetermined time $\tau_4$ between time $\tau_5$ and time $\tau_6$. This large change of the valve opening degree EVC to the upper limit value VC1 increases the valve opening degree EVC excessively over the range of the error. Nevertheless, the reason for this action is that the liquid refrigerant that stays excessively in the outdoor heat exchanger 22 can be immediately used as a circulation amount of the refrigeration cycle 20 by maximizing the valve opening degree EVC of the cooling expansion valve 2 making up a refrigerant circulation path. According to this embodiment, therefore, the valve opening degree EVC is held at the upper limit value VC1 when the rotational speed IVR reaches the predetermined rotational speed IVX.

This immediately eliminates the gas shortage in the cooling heat exchanger 11 and can reduce the rotational speed IVR within a short time. Further, the rapid reduction in the rotational speed IVR can save the power of the compressor 21 for an improved efficiency of the refrigeration cycle 20.

Even when the valve opening degree EVC is increased to the upper limit value VC1 as described above, the cooling capacity of the cooling heat exchanger 11 is not immediately improved due to the delayed balancing between high and low pressure in the refrigeration cycle 20. In fact, FIG. 17 assumes such a case and shows that the rotational speed IVR increases even during the period from time $\tau_5$ to time $\tau_6$.

Step S506 calculates SCO-1 at time $\tau_5$, and therefore step S380 corrects SCO by reducing it by 1° C. at time $\tau_6$ and calculates SCO-1 as a corrected supercooling degree. At and after time $\tau_6$, step S390 calculates ΔEVC according to the difference between the calculated supercooling degree SC and the above-mentioned SCO-1. The actual supercooling degree SC', therefore, approaches the target supercooling degree SCO calculated at time $\tau_5$. As a result, when the theoretical supercooling degree SC of the refrigeration cycle 20 is smaller than the actual supercooling degree SC' in the cooling operation mode, the deterioration of the efficiency of the refrigeration cycle 20 can be suppressed.

Figure 17:
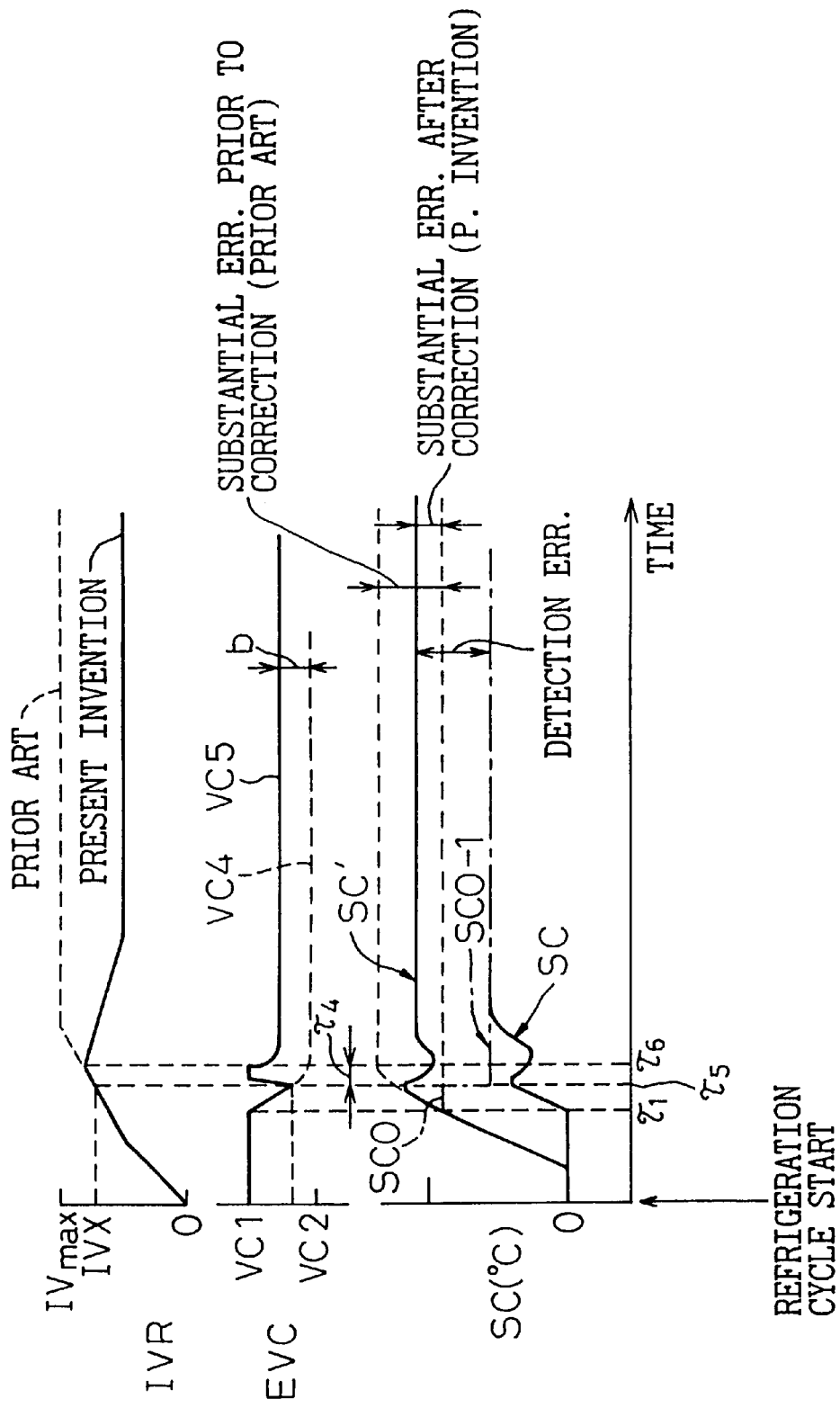
FIG. 17 is a timing chart for the electric expansion valve according to the second embodiment.

Also, as compared with the conventional system (with SCO not corrected), the valve opening degree EVC is large by a predetermined opening degree shown as b in FIG. 17, i.e. by VC4–VC5. Thus, at and after the time $\tau_6$, the gas shortage in the cooling heat exchanger 11 is eliminated and the cooling capacity of the cooling heat exchanger 11 is improved. With the arrival of a certain time after $\tau_6$, therefore, the rotational speed IVR rapidly drops below the predetermined rotational speed IVX. Thus, the power of the compressor 21 can be saved as described above, and the resulting smaller power W of the compressor 21 can suppress the deterioration of the efficiency of the refrigeration cycle 20. Further, the noise and vibrations due to the rotation of the compressor 21 can be reduced.

In the foregoing description, the rotational speed IVR is reduced to the predetermined rotational speed IVX by a single session of correcting SCO to SCO-1. Actually, however, in the case where the first correction cannot reduce the rotational speed IVR to the predetermined rotational speed IVX, the process jumps from step S502 to step S506 which continues to be executed until the rotational speed IVR is reduced to the predetermined rotational speed IVX.

The fact that the rotational speed IVR is reduced from a level below the level of the predetermined rotational speed IVX as described above while in the cooling operation mode is indicative of the fact that the theoretical supercooling degree SC is smaller than the actual supercooling degree SC' due to the error described above. If the process is returned to step S120 without executing the process of step S509 and SCO is calculated only in step S230, the efficiency of the refrigeration cycle may deteriorate again.

To prevent such an inconvenience, according to this embodiment, the number A of corrections in step S509 is regarded as corresponding to the magnitude of the error. Once SCO is corrected, therefore, SCO is always replaced by SCO1 in step S370 and ΔSC is calculated from SCO1-A and the theoretical supercooling degree as many times as the number A of corrections in step S380. As a result, even when the cooling operation mode continues, the deterioration of the efficiency of the refrigeration cycle 20 can be suppressed. Alternatively, the number A of corrections is stored in memory, and SCO in step S370 is regarded always as SCO1 and ΔSC is calculated from SCO1-A and the theoretical supercooling degree SC in step S380 during the subsequent cooling operation (Learning Control I).

Third Embodiment

In the first embodiment described above, in the absence of a change in the valve opening degree EVC (EVH) in step S422, the valve opening degree EVC is reduced by correcting SCO. According to the present embodiment, in contrast, a predetermined valve opening degree is preset as a change amount of the valve opening degree EVC in the absence of a change in the valve opening degree EVC (EVH) in step S422, so that the valve opening degree EVC is immediately increased beyond the upper limit VC1 by a predetermined value regardless of the SCO. As a result, a similar effect to the first embodiment is obtained. This predetermined opening degree is set as a small value as compared with the whole working range of the valve opening degree EVC so that the valve opening degree EVC is located at an intermediate position in the working range.

Fourth Embodiment

According to the second embodiment, step S501 corrects the SCO when the rotational speed IVR exceeds the predetermined rotational speed IVX thereby to increase the valve opening degree EVC. In this embodiment, on the other hand, with the increase of the rotational speed IVR beyond the predetermined rotational speed IVX in step S501, the valve opening degree EVC is immediately increased by a predetermined opening degree as a preset change amount of the valve opening degree EVC without regard to the SCO value described above. As a result, a similar effect to the second embodiment is obtained. The predetermined opening degree is set as a sufficiently small value as compared with the whole working range of the valve opening degree EVC so that the valve opening degree is located at an intermediate position of the working range thereof.

Modification

According to the first and third embodiments, the valve opening degree EVC is reduced when the change amount of the valve opening degree EVC with respect to the upper limit value VC1 is zero. As an alternative, the valve opening degree EVC may be reduced by a predetermined value when the change amount is smaller than a predetermined minuscule amount instead of zero.

In each of the embodiments described above, once the refrigeration cycle 20 is started, the valve opening degree EVC (EVH) is increased to the upper limit value VC1 (VH1). Instead, the valve opening degree EVC (EVH) can be increased to a value somewhat smaller than the upper limit value.

Figure 18:
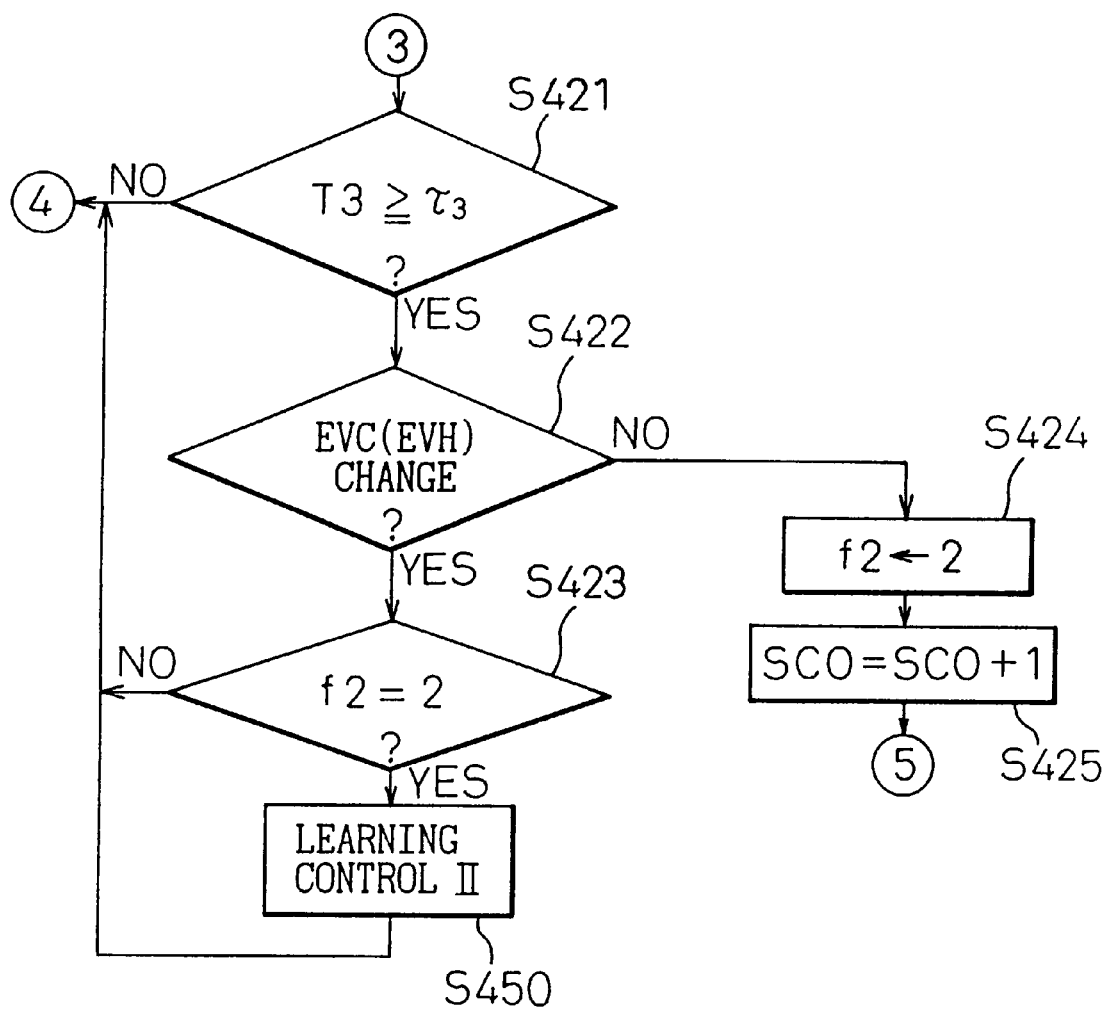
FIG. 18 shows the contents of the learning control according to a modification of the first embodiment.

Also, according to the first embodiment, once the valve opening degree EVC (EVH) undergoes a change, the valve opening degree EVC (EVH) is subsequently held until the refrigeration cycle 20 stops in step S426. As an alternative, a learning control at step S450 in FIG. 18 can be executed as following.

Namely, the number B of corrections is stored in memory in step S425 and is regarded as a value corresponding to the magnitude of the sensor error. The SCO, once corrected, is always set to SCO1 in steps S230 and S370 as many times as the number A of corrections to make SCO=SCO1+B. In other words, B is always added to SCO in steps S230 and S370 to control the valve opening degree EVC (EVH) (Learning Control II). As a result, even in the protracted cooling or heating operation mode, the deterioration of the efficiency of the refrigeration cycle can continue to be suppressed.

According to the second and fourth embodiments, when the rotational speed IVR exceeds the predetermined rotational speed IVX in step S501, the target supercooling degree SCO is corrected or the valve opening degree EVC is increased immediately by a predetermined value. Alternatively, a signal associated with the valve opening degree EVC is used in the control unit 40 in such a manner that when this signal decreases below a predetermined valve opening degree, the target supercooling degree SCO can be corrected downward or the valve opening degree EVC can be increased by a predetermined value.

Also, in the second and fourth embodiments, the same control operation can be performed in the heating operation mode as in the cooling operation mode.

Again, in the second and fourth embodiments, with the increase of the rotational speed IVR beyond the predetermined rotational speed IVX in step S501, the target supercooling degree SCO is corrected or the valve opening degree EVC is immediately increased. When the cooling heat exchanger 11 runs short of gas and the post-evaporator air temperature increases beyond a predetermined temperature, however, the target supercooling degree SCO can be corrected or the valve opening degree EVC can be increased by a predetermined value.

Further, in the second and fourth embodiments described above, when the rotational speed IVR exceeds the predetermined rotational speed IVX in step S501, the target supercooling degree SCO is corrected or the valve opening degree EVC is immediately increased by a predetermined value. With the increase in the rotational speed of the compressor 21, however, the temperature of the refrigerant discharged from the compressor 21 increases. In view of this, as an alternative, a refrigerant temperature sensor is provided as a means for detecting the refrigerant temperature, so that when the refrigerant temperature detected by the refrigerant temperature sensor 47 increases beyond a predetermined level, the target supercooling degree SCO is corrected or the valve opening degree EVC is increased by a predetermined value.

Furthermore, in the second and fourth embodiments described above, when the rotational speed IVR exceeds the predetermined value IVX in step S501, the high pressure discharged from the compressor 21 increases. In view of this, as an alternative, when the high pressure detected by the sensor 43 exceeds a predetermined level, the target supercooling degree SCO is corrected or the valve opening degree EVC is increased by a predetermined value.

What is more, in the second and fourth embodiments described above, the fact that the rotational speed IVR exceeds the predetermined rotational speed IVX in step S501 is indicative of the possibility of employing a method in which when the input current or the output current of the invertor 31 or the rate of increase thereof is larger than a predetermined value, the target supercooling degree SCO is corrected or the valve opening degree EVC is increased by a predetermined value.

Also, in each of the above-mentioned embodiments, the upper limit VH1 (or VC1) and the lower limit VH2 (or VC2) of the valve opening degree EVC (EVH) can be changed according to the environmental conditions. When the internal load of the cabin is large, for example, the upper limit value VH1 (or VC1) is increased as compared with when the load is smaller and VH2 (or VC2) is increased accordingly.

Further, each of the embodiments described above, which was explained with reference to the manual control of the refrigeration cycle operation mode, is also applicable to the automatic control with equal effect.

Furthermore, although the above-mentioned embodiments refer to the air-conditioning system for the electric vehicle, the present invention is applicable to the air-conditioning system for engine-driven vehicles and the indoor air-conditioning system as well.

What is more, the present invention is applicable to the refrigeration cycle system of gas injection type like the one described in Japanese unexamined patent publication (Kokai) no. 9-39550 with equal effect.

What is claimed is:

1. A refrigeration cycle control system comprising:

a refrigeration cycle including a compressor for compressing a refrigerant, condensers for condensing the refrigerant discharged from said compressor, electric expansion valves for reducing the pressure of the refrigerant supplied from said condensers and an evaporator for evaporating the refrigerant supplied from said electric expansion valves;

means for detecting the supercooling information relating to the supercooling degree of the liquid refrigerant in said condensers; and means for calculating the theoretical supercooling degree based on said supercooling information;

wherein the valve opening degree of said electric expansion valves is set to a predetermined initial opening degree for a first predetermined length of time from the starting of said refrigeration cycle by driving said compressor;

wherein said valve opening degree, is controlled so that said theoretical supercooling degree reaches a predetermined target supercooling degree after the lapse of said first predetermined length of time; and wherein said valve opening degree is reduced by a predetermined value in the case where the amount of change of said valve opening degree with respect to said initial opening degree is smaller than a predetermined value during a second predetermined length of time after the lapse of said first predetermined length of time.

2. A refrigeration cycle control system according to claim 1, wherein said valve opening degree is reduced by a predetermined value when said change amount is zero.

3. A refrigeration cycle control system according to claim 1, wherein said valve opening degree is reduced immediately by said predetermined value when the amount of change of said valve opening degree with respect to said initial opening degree is smaller than a predetermined amount set in advance.

4. A refrigeration cycle control system according to claim 1, further comprising means for correcting said target supercooling degree upward by a predetermined value;

wherein said valve opening degree is controlled so that said theoretical supercooling degree coincides with the target supercooling degree corrected by said correcting means.

5. A refrigeration cycle control system according to claim 1, wherein said initial opening degree is the maximum opening degree in the working opening degree range of said electric expansion valves.

6. A refrigeration cycle control system according to claim 5, wherein the correction amount by the correcting means before said valve opening degree is reduced by said predetermined value is learned and stored thereby to control said valve opening degree by learning.

7. A refrigeration cycle control system according to claim 5, wherein the correction amount before said valve opening degree increases by said predetermined opening degree is learned and stored thereby to control by learning said valve opening degree.

8. A refrigeration cycle control system according to claim 1, wherein said refrigeration cycle is an accumulator cycle having an accumulator for separating the gas-liquid two-phase refrigerant from said evaporators into a gas-phase refrigerant and a liquid-phase refrigerant and taking said gas-phase refrigerant into said compressor.

9. An air-conditioning system having a refrigeration cycle control system according to claim 8:

wherein said evaporator is arranged in an air-conditioning case forming a flow path to a cabin, and functions as a cooling heat exchanger for cooling the cabin in the cabin cooling mode;

wherein said electric expansion valve is a cooling expansion valve for controlling said supercooling degree in the cooling mode; and wherein said condenser is an outdoor heat exchanger arranged outside of said air-conditioning case.

10. An air-conditioning system according to claim 8:

wherein said condenser includes a heating condenser arranged in said air-conditioning case for heating the cabin in addition to said outdoor heat exchanger;

wherein said electric expansion valve includes, in addition to said cooling expansion valve, a heating expansion valve for controlling the supercooling degree in the heating operation mode; and wherein said refrigeration cycle is of heat pump type for sequentially circulating the refrigerant through said compressor, said outdoor heat exchanger, said cooling expansion valve, said cooling heat exchanger and said accumulator in the cooling mode, and through compressor, said heating condense, said heating expansion valve, said outdoor heat exchanger and said accumulator in the heating mode, said outdoor heat exchanger functioning as an evaporator.

11. A refrigeration cycle control system according to claim 1, wherein said valve opening degree is held at said predetermined opening degree as long as said refrigeration cycle is working after said valve opening degree is changed from said initial valve opening degree downward to a predetermined opening degree.

12. A refrigeration cycle control system according to claim 1:

wherein said supercooling information detection means includes means for detecting the high pressure of said refrigeration cycle and outlet temperature detection means for detecting the refrigerant temperature at the outlet of said condensers; and wherein said supercooling degree calculation means calculates the condensation temperature from the high pressure detected by said high pressure detection means, and said theoretical supercooling degree is calculated based on said condensation temperature and said outlet refrigerant temperature detected by said outlet temperature detection means.

13. In an air-conditioning system comprising:

a refrigeration cycle including a compressor for compressing a refrigerant, a condenser for condensing the refrigerant from said compressor, an electric expansion valve for reducing the pressure of the refrigerant from said condenser, and an evaporator for evaporating the refrigerant from said electric expansion valve;

supercooling information detection means for detecting the supercooling information relating to the supercooling degree of the liquid refrigerant in said condenser; and supercooling degree calculation means for calculating the theoretical supercooling degree based on said supercooling information;

wherein the valve opening degree of said electric expansion valve is controlled so that said theoretical supercooling degree coincides with a predetermined target supercooling degree; and wherein the rotational speed of said compressor is controlled so that the air cooling degree in said evaporator coincides with a predetermined target cooling degree;

a refrigeration cycle control system comprising signal generating means for generating a signal associated with said rotational speed, wherein when said signal increases beyond a predetermined rotational speed, said target supercooling degree is corrected downward by a predetermined supercooling degree to reach a corrected target supercooling degree by controlling said valve opening degree.

14. An air-conditioning system according to claim 13, wherein before correcting said target supercooling degree and controlling said valve opening degree, said valve opening degree is held at a maximum opening degree in the working opening degree range thereof for a predetermined time.

15. In an air-conditioning system comprising:

a refrigeration cycle including a compressor for compressing a refrigerant, a condenser for condensing the refrigerant from said compressor, an electric expansion valve for reducing the pressure of the refrigerant from said condenser, and an evaporator for evaporating the refrigerant from said electric expansion valve;

supercooling information detection means for detecting the supercooling information relating to the supercooling degree of the liquid refrigerant in said condenser; and supercooling degree calculation means for calculating the theoretical supercooling degree based on said supercooling information;

wherein the valve opening degree of said electric expansion valve is controlled so that said theoretical supercooling degree coincides with a predetermined target supercooling degree; and wherein the rotational speed of said compressor is controlled so that the air cooling degree in said evaporator coincides with a predetermined target cooling degree;

a refrigeration cycle control system comprising signal generating means for generating a signal associated with said rotational speed, wherein when said signal exceeds a predetermined rotational speed, said valve opening degree is immediately controlled upward by said predetermined opening degree set in advance.

16. An air-conditioning system according to claim 15, wherein before increasing said valve opening degree by a predetermined opening degree, said valve opening degree is held at the maximum opening degree in the working opening degree range thereof for a predetermined time.

17. In an air-conditioning system comprising:

a refrigeration cycle including a compressor for compressing a refrigerant, a condenser for condensing the refrigerant from said compressor, an electric expansion valve for reducing the pressure of the refrigerant from said condenser, and an evaporator for evaporating the refrigerant from said electric expansion valve;

supercooling information detection means for detecting the supercooling information relating to the supercooling degree of the liquid refrigerant in said condenser; and supercooling degree calculation means for calculating the theoretical supercooling degree based on said supercooling information;

wherein the valve opening degree of said electric expansion valve is controlled so that said theoretical supercooling degree calculated by said supercooling degree calculation means coincides with a target supercooling degree; and wherein the rotational speed of said compressor is controlled so that the air cooling degree in said evaporator coincides with a predetermined target cooling degree;

a refrigeration cycle control system comprising signal generating means for generating a signal associated with said valve opening degree, wherein when the signal generated by said signal generating means decreases below a predetermined valve opening degree, said target supercooling degree is corrected downward by a predetermined supercooling degree to reach a corrected target supercooling degree by controlling said valve opening degree.

18. In an air-conditioning system comprising:

a refrigeration cycle including a compressor for compressing a refrigerant, a condenser for condensing the refrigerant from said compressor, an electric expansion valve for reducing the pressure of the refrigerant from said condenser, and an evaporator for evaporating the refrigerant from said electric expansion valve;

supercooling information detection means for detecting the supercooling information relating to the supercooling degree of the liquid refrigerant in said condenser;

supercooling degree calculation means for calculating the theoretical supercooling degree based on said supercooling information; and detection means for detecting the air cooling degree in said evaporator;

wherein the valve opening degree of said electric expansion valve is controlled so that said theoretical supercooling degree calculated by said supercooling degree calculation means coincides with a predetermined target supercooling degree; and wherein the rotational speed of said compressor is controlled so that the air cooling degree in said evaporator coincides with a predetermined target cooling degree;

a refrigeration cycle control system, wherein when said air cooling degree increases beyond a predetermined cooling degree, said target supercooling degree is corrected downward by a predetermined supercooling degree to coincide with a corrected target supercooling degree by controlling said valve opening degree.

19. In an air-conditioning system comprising:

a refrigeration cycle including a compressor for compressing a refrigerant, a condenser for condensing the refrigerant from said compressor, an electric expansion valve for reducing the pressure of the refrigerant from said condenser, and an evaporator for evaporating the refrigerant from said electric expansion valve;

supercooling information detection means for detecting the supercooling information relating to the supercooling degree of the liquid refrigerant in said condenser; and supercooling degree calculation means for calculating the theoretical supercooling degree based on said supercooling information;

wherein the valve opening degree of said electric expansion valve is controlled so that the theoretical supercooling degree calculated by said supercooling degree calculation means coincides with a predetermined target supercooling degree, and wherein the rotational speed of said compressor is controlled so that the air cooling degree in said evaporator coincides with a predetermined target cooling degree;

a refrigeration cycle control system, wherein when the temperature of the refrigerant discharged from said compressor increases beyond a predetermined temperature, said target supercooling degree is corrected downward by a predetermined supercooling degree to coincide with a corrected target supercooling degree by controlling said valve opening degree.

* * * * *

UNITED STATES PATENT AND TRADEMARK OFFICE
CERTIFICATE OF CORRECTION

PATENT NO. : 6,073,459
DATED :
INVENTOR(S) : June 13, 2000

Kunio Iritani

It is certified that error appears in the above-identified patent and that said Letters Patent is hereby corrected as shown below:

Col. 2, line 57, "(EVCEVH)" should be --(EVC, EVH)--

Col. 4, line 44, "AEVH" should be --ΔEVH"--

Col. 4, line 60, "ASC" should be --ΔSC--

Col. 4, line 60, "AEVH" should be --ΔEVH--

Col. 8, line 29, delete 3rd occurrence of "the"

Col. 15, line 55, "τ2" should be --$\tau_2$--

Col. 15, line 57, "τ1" should be --$\tau_1$--

Col. 16, line 18, "if set it is" should be --if it is set--

Col. 21, line 23, claim 10, "condense" should be --condenser--

Signed and Sealed this

Seventeenth Day of April, 2001

Attest:

NICHOLAS P. GODICI

*Attesting Officer*   *Acting Director of the United States Patent and Trademark Office*